(12) United States Patent
Zhang et al.

(10) Patent No.: US 12,507,271 B2
(45) Date of Patent: Dec. 23, 2025

(54) DETECTION OR SENSING-BASED INTER-gNB CLI MITIGATION

(71) Applicant: QUALCOMM Incorporated, San Diego, CA (US)

(72) Inventors: Qian Zhang, Basking Ridge, NJ (US); Yan Zhou, San Diego, CA (US); Muhammad Sayed Khairy Abdelghaffar, San Jose, CA (US); Navid Abedini, Basking Ridge, NJ (US); Abdelrahman Mohamed Ahmed Mohamed Ibrahim, San Diego, CA (US); Junyi Li, Fairless Hills, PA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 736 days.

(21) Appl. No.: 17/815,899

(22) Filed: Jul. 28, 2022

(65) Prior Publication Data

US 2024/0040604 A1 Feb. 1, 2024

(51) Int. Cl.
*H04W 72/542* (2023.01)
(52) U.S. Cl.
CPC ................................. *H04W 72/542* (2023.01)
(58) Field of Classification Search
CPC . H04W 72/542; H04W 92/20; H04W 72/541; H04W 72/27
See application file for complete search history.

(56) References Cited

U.S. PATENT DOCUMENTS

| | | | | |
|---|---|---|---|---|
| 2016/0029407 | A1* | 1/2016 | Soldati | H04W 74/006 370/329 |
| 2021/0007147 | A1* | 1/2021 | Yang | H04W 56/001 |
| 2022/0201524 | A1* | 6/2022 | Ying | H04W 74/0866 |

FOREIGN PATENT DOCUMENTS

KR 20180136328 A 12/2018

OTHER PUBLICATIONS

International Search Report and Written Opinion—PCT/US2023/027734—ISA/EPO—Nov. 6, 2023.
ZTE: "Discussion on Remaining Issues of Network Coordination Mechanisms", 3GPP TSG RAN WG1 #96, R1-1901970, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019, 7 Pages, XP051599663, Section 2.1-Section 2.2, p. 4, Section 2.3.

\* cited by examiner

*Primary Examiner* — Ashley Shivers
(74) *Attorney, Agent, or Firm* — Procopio, Cory, Hargreaves & Savitch LLP

(57) ABSTRACT

Apparatus, methods, and computer program products for CLI mitigation are provided. An example method may include receiving scheduling information for one or more UL transmissions associated with one or more neighbor UEs and a second network entity. The example method may further include performing one or more actions based on a sensing operation for the one or more UL transmissions.

30 Claims, 23 Drawing Sheets

DETECTION OR SENSING-BASED INTER-gNB CLI MITIGATION

TECHNICAL FIELD

The present disclosure relates generally to communication systems, and more particularly, to wireless communication systems with crosslink interference (CLI) mitigation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to receive scheduling information for one or more UL transmissions associated with one or more neighbor UEs and a first network entity. The memory and the at least one processor coupled to the memory may be configured to perform a sensing operation for the one or more UL transmissions. The memory and the at least one processor coupled to the memory may be configured to transmit a result of the sensing operation to a second network entity. The memory and the at least one processor coupled to the memory may be configured to receive scheduling information for one or more UL transmissions associated with the UE and a network entity. The memory and the at least one processor coupled to the memory may be configured to perform a sensing operation for the one or more UL transmissions. The memory and the at least one processor coupled to the memory may be configured to transmit a result of the sensing operation to the network entity.

In another aspect of the disclosure, a method, a computer-readable medium, and an apparatus at a network entity are provided. The apparatus may include a memory and at least one processor coupled to the memory. The memory and the at least one processor coupled to the memory may be configured to receive, via backhaul signaling or over-the-air (OTA) signaling, scheduling information for one or more UL transmissions associated with one or more neighbor UEs and a second network entity. The memory and the at least one processor coupled to the memory may be configured to perform one or more actions based on a sensing operation for the one or more UL transmissions. The memory and the at least one processor coupled to the memory may be configured to receive scheduling information for a DL transmission associated with one or more UEs. The memory and the at least one processor coupled to the memory may be configured to perform one or more actions based on a sensing operation for one or more UL transmissions based on the scheduling information, the DL transmission being overlapping in a timing with the one or more UL transmissions based on a dynamic time division duplex (TDD) or full-duplex.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
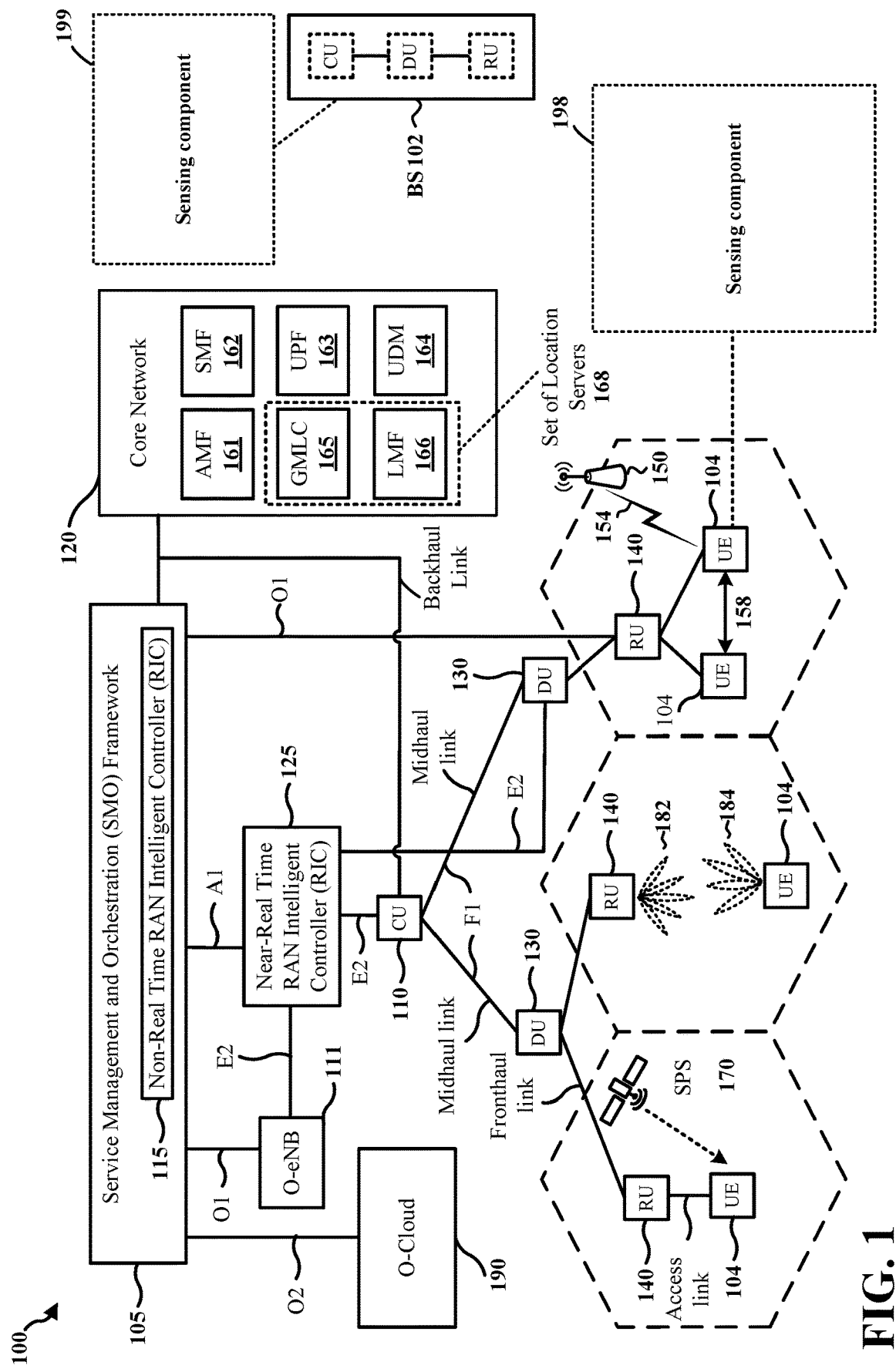
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a sensing component 198. The sensing component 198 may be configured to receive scheduling information for one or more UL transmissions associated with one or more neighbor UEs and a first network entity. The sensing component 198 may be configured to perform a sensing operation for the one or more UL transmissions. The sensing component 198 may be configured to transmit a result of the sensing operation to a second network entity. The sensing component 198 may be configured to receive scheduling information for one or more UL transmissions associated with the UE and a network entity. The sensing component 198 may be configured to perform a sensing operation for the one or more UL transmissions. The sensing component 198 may be configured to transmit a result of the sensing operation to the network entity.

In certain aspects, the base station 102 may include a sensing component 199. The sensing component 199 may be configured to receive, via backhaul signaling or over-the-air (OTA) signaling, scheduling information for one or more UL transmissions associated with one or more neighbor UEs and a second network entity. The sensing component 199 may be configured to perform one or more actions based on a sensing operation for the one or more UL transmissions. The sensing component 199 may be configured to receive scheduling information for a DL transmission associated with one or more UEs. The sensing component 199 may be configured to perform one or more actions based on a sensing operation for the one or more UL transmissions based on the scheduling information, the DL transmission being overlapping in a timing with the one or more UL transmissions based on a dynamic TDD or full-duplex.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 2:
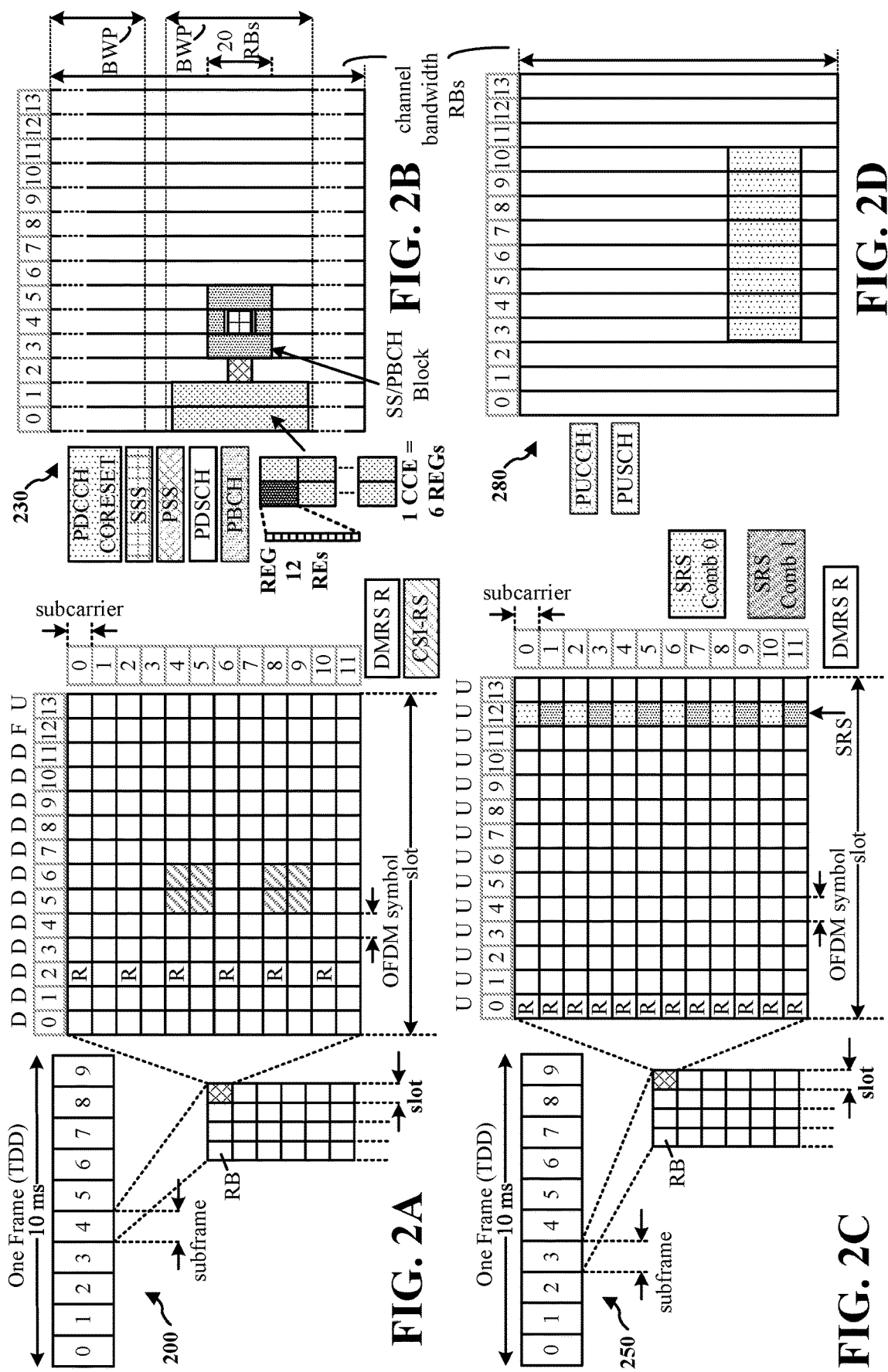
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI).

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

Numerology, SCS, and CP

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
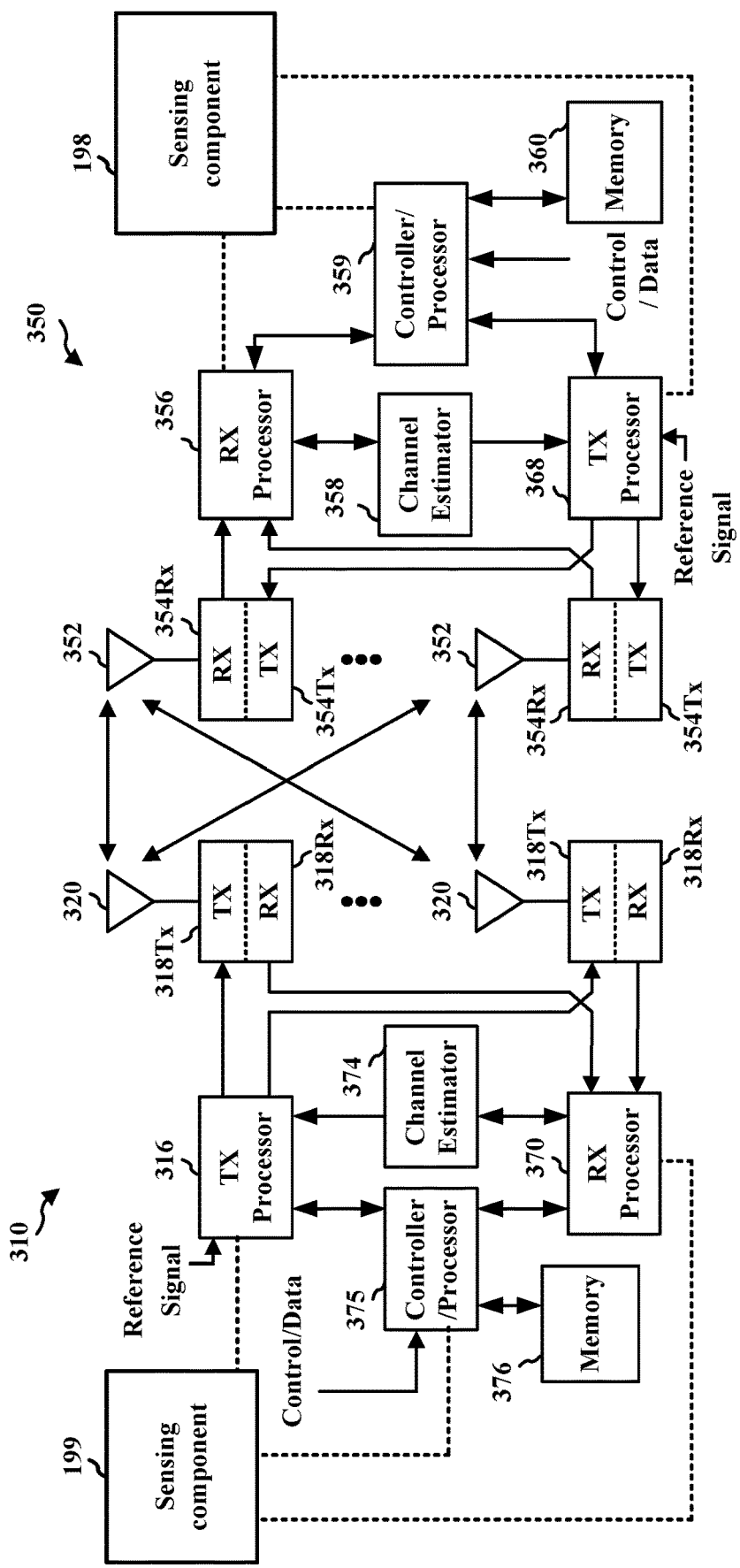
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with sensing component 198 of FIG. 1.

At least one of the TX processor 316, the RX processor 370, and the controller/processor 375 may be configured to perform aspects in connection with sensing component 199 of FIG. 1.

In some wireless communication systems, full duplex (FD) capability (supporting simultaneous UL or DL transmission) may be present at a base station, a UE, or both the base station and the UE. For example, at the UE, UL transmissions may be transmitted from a first panel of the UE while simultaneous DL receptions may be received at a second panel of the UE. The first panel and the second panel may be different panels of the antenna(s) on the UE. As another example, at the base station, UL receptions may be received from a first panel of the base station while simultaneous DL transmissions may be transmitted at a second panel of the base station. The first panel and the second panel may be different panels of the antenna(s) on the base station. By supporting FD, latency of communications may be potentially reduced. For example, it may be possible for a UE to receive DL signal in slots assigned for UL, which may enable latency savings. Furthermore, by supporting FD, spectrum efficiency per cell and per UE may be improved because resource utilization over the spectrum may be more efficient.

Subband (SB) non-overlapping full duplex and dynamic/flexible time division duplex (TDD) may be used in wireless communication systems to enhance spectrum efficiency and enhance throughput by dynamically altering UL or DL transmission direction. However, inter-network entity and inter-UE CLI, which may be intra-subband CLI or inter-subband CLI may occur. A victim UE or a victim network entity may receive transmissions not targeted to the victim from an aggressor UE or an aggressor network entity. For example, CLI may occur when a UL/DL symbol from the aggressor collides with a UL/DL symbol of the victim.

Figure 4:
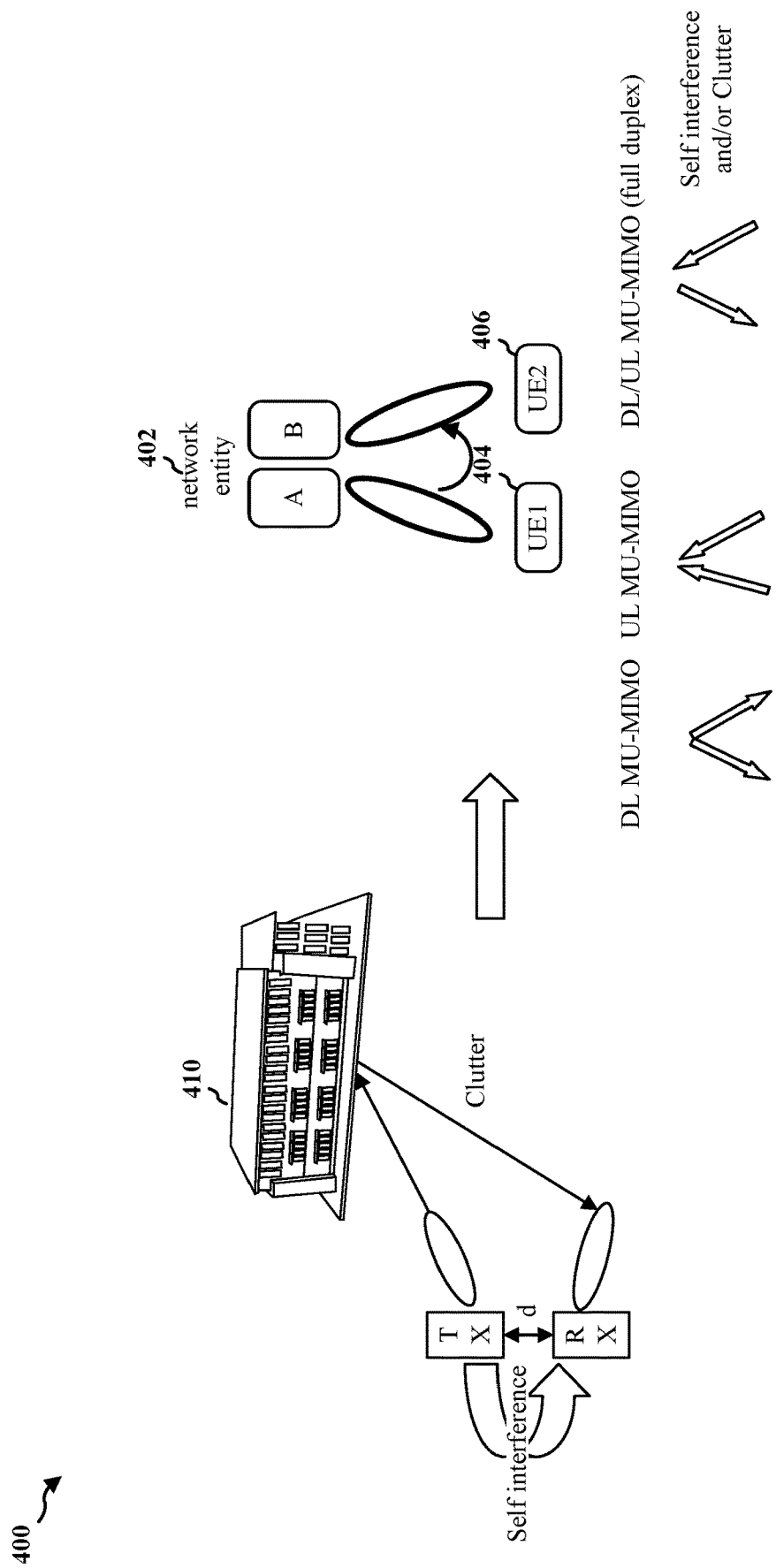
FIG. 4 is a diagram illustrating example full duplex at a network entity.

FIG. 4 is a diagram 400 illustrating example full duplex at a network entity. As illustrated in FIG. 4, at a network entity 410, there may be self-interference between Tx and Rx at the network entity 410 due to simultaneous Tx and Rx operations. Similarly, at a network entity 402, the network entity 402 may be in communication with a UE 404 and a UE 406. In some aspects, the network entity 402 may simultaneously transmit to both the UE 404 and the UE 406. In some aspects, the network entity 402 may simultaneously receive from both the UE 404 and the UE 406. With full duplex, the network entity 402 may simultaneously transmit to the UE 404 and receive from the UE 406, and self-interference or clutter between the transmission and the reception may occur.

Figure 5:
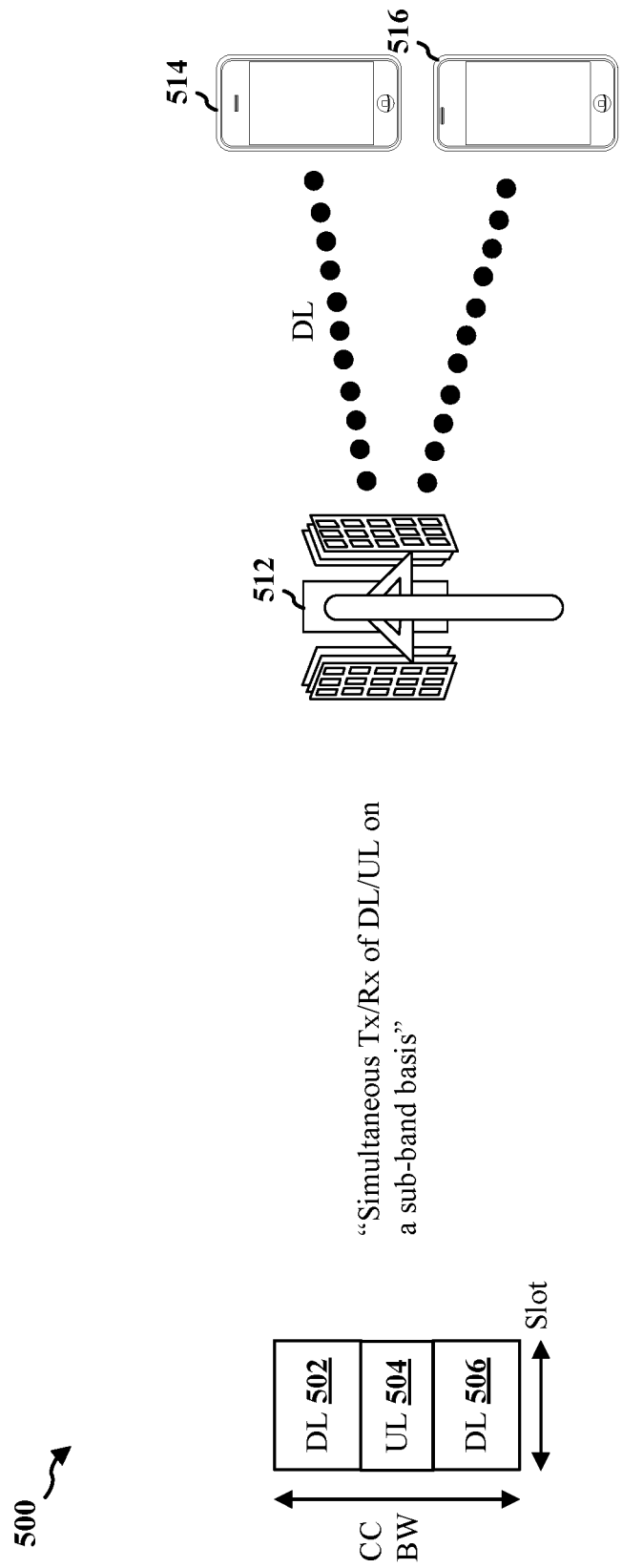
FIG. 5 is a diagram illustrating example subband full duplex.

FIG. 5 is a diagram 500 illustrating example subband full duplex (SBFD). In subband full duplex, transmission resources (e.g., DL resource 502 and DL resource 506) and reception resources (e.g., UL resource 504) may overlap in time using different frequencies. A base station 512 may transmit to UE 514 using DL resource 502 and DL resource 506 while receiving from UE 516 using UL resource 504. In contrast, in-band full-duplex (IBFD) may be based on transmitting and receiving in resources overlapping in time and overlapping in frequency. By using SBFD, UL duty cycle may be increased which may lead to latency reduction (e.g., it is possible to receive DL signal in UL slots, which can enable latency savings) and UL coverage improvement, enhanced system capacity/resource utilization/spectrum efficiency, and enable flexible and dynamic UL/DL resource adaption according to UL/DL traffic in a robust manner.

Figure 6:
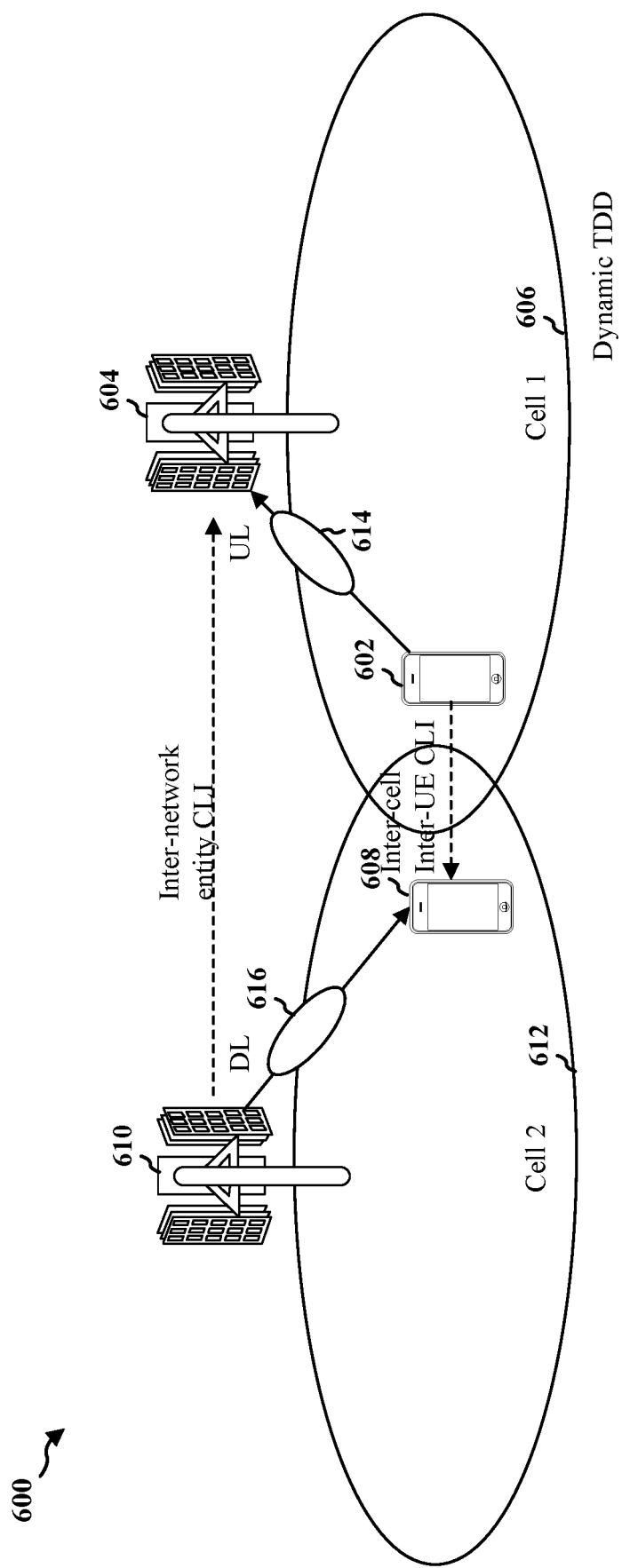
FIG. 6 is a diagram illustrating example CLI.

FIG. 6 is a diagram 600 illustrating example CLI. A first UE 602 may be within a first cell 606 and served by a first network entity 604 and a second UE 608 may be within a second cell 612 and served by a second network entity 610. CLI may occur between UEs at the cell edges of nearby cells, as UEs at cell edges of nearby cells may be in close proximity to each other. As illustrated in FIG. 6, the first UE 602 and the second UE 608 are respectively at cell edge of the first cell 606 and the second cell 612. The first UE 602 and the second UE 608 may be respective communication with the first network entity 604 and the second network entity 610. For example, the first UE 602 may transmit a UL transmission 614 to the first network entity 604 while the second UE 608 receives a DL transmission 616 from the second network entity 610. In some aspects, the UL transmission 614 to the first network entity 604 may also be received by the second UE 608, which may cause inter-UE CLI. As such, at the second UE 608, one or more symbols of the UL transmission 614 may collide with one or more symbols of the DL transmission 616. In addition to inter-UE CLI, inter-network entity CLI may also occur. For example, the first network entity 604 may receive the DL transmission 616 while receiving the UL transmission 614. As such, at the first network entity 604, one or more symbols of the UL transmission 614 may collide with one or more symbols of the DL transmission 616. The first network entity 604 may be referred to as a "victim network entity" because the first network entity 604 may be receiving a transmission not intended to be received by the first network entity 604 that interferes with a transmission that is intended to be received by the first network entity 604. Similarly, the second UE 608 may be referred to as a "victim UE." The second network entity 610 may be referred to as an "aggressor network entity" because a transmission from the second network entity 610 may cause CLI to another network entity. Similarly, the first UE 602 may be referred to as an "aggressor UE." Aspects provided herein may provide mechanisms for reducing inter-network entity CLI for full duplex operations, increasing overall efficiency and throughput of the communication system.

Figure 7:
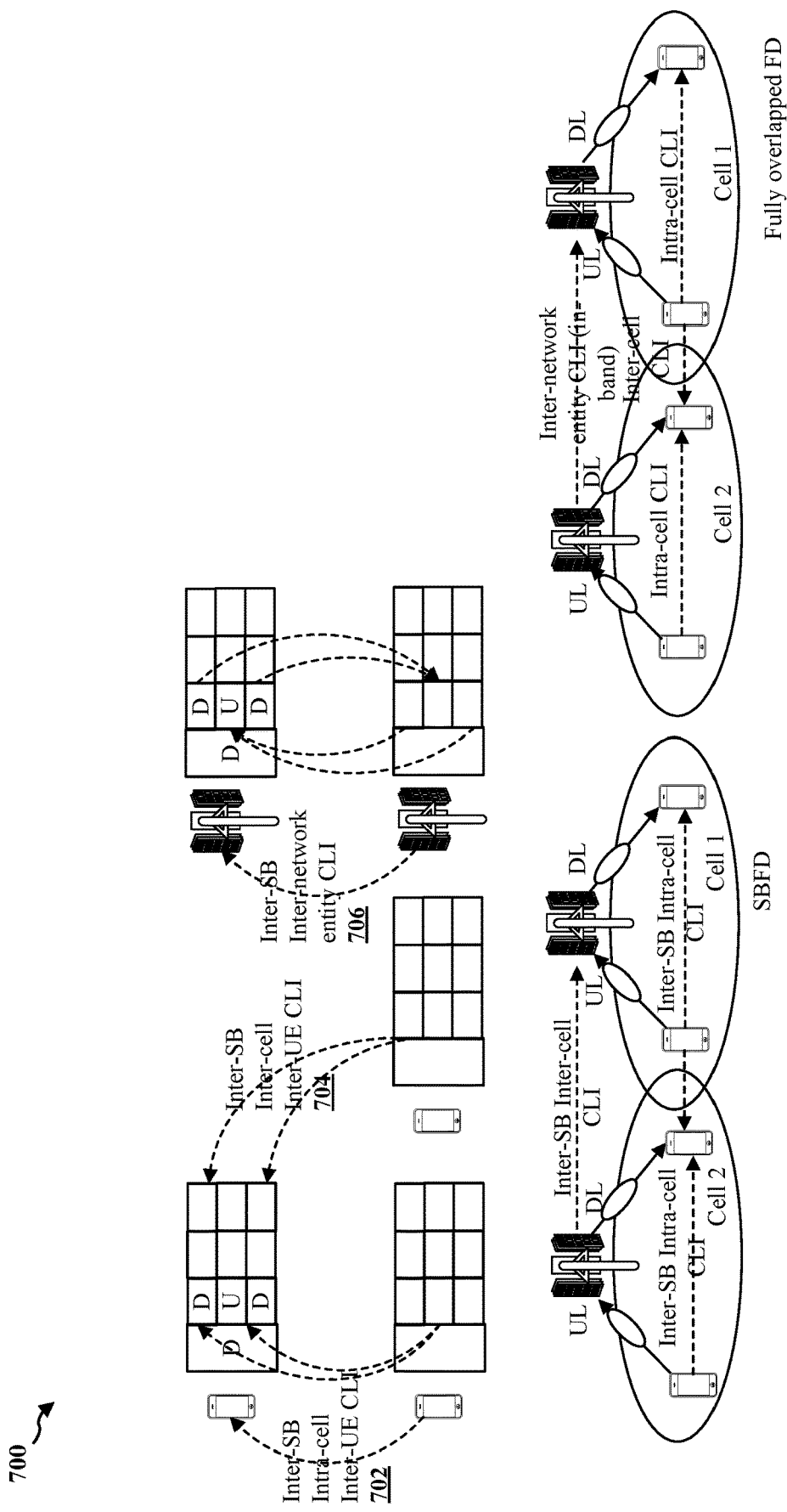
FIG. 7 is a diagram illustrating example CLI.

FIG. 7 is a diagram 700 illustrating example CLI. As illustrated in FIG. 7, CLI may be within a same cell or in different cells (intra-cell or inter-cell), within a same SB or in different SBs (intra-SB or inter-SB), between UEs (inter-UE) or between network entities (inter-network entity which may be otherwise referred to as inter-gNB). For example, in a communication system, there may be inter-SB, intra-cell, inter-UE CLI 702. There may also be inter-SB, inter-cell, and inter-UE CLI 704. There may also be inter-SB inter-network entity CLI 706.

Figure 8:
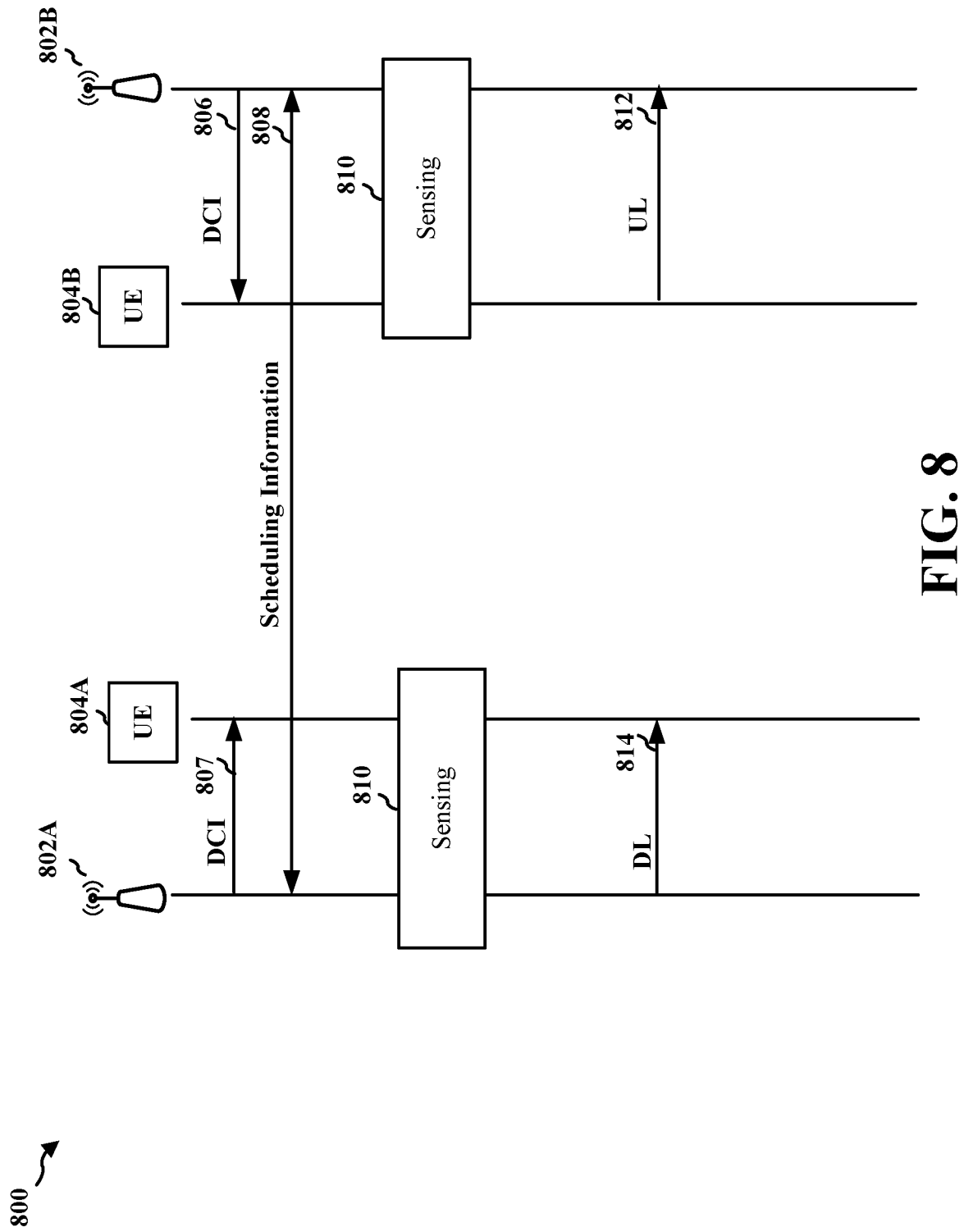
FIG. 8 is a diagram illustrating example communications between network entities and UEs.

FIG. 8 is a diagram 800 illustrating example communications between network entity 802A and network entity 802B and UE 804A and UE 804B. In some aspects, the network entity 802A and the network entity 802B may be implemented as an aggregated base station, a disaggregated base station, an integrated access and backhaul (IAB) node, a relay node, a sidelink node, or the like. In some aspects, the network entity 802A and the network entity 802B may be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC. In some aspects, the UE 804A and the UE 804B may be respectively on cell edges of the network entity 802A and the network entity 802B.

As illustrated in FIG. 8, the network entity 802A may transmit DCI 807 to the UE 804A to schedule a DL transmission 814. In some aspects, the network entity 802B may transmit DCI 806 to the UE 804B to schedule a UL transmission 812. The network entity 802B may also transmit scheduling information 808 of the UL transmission 812 (e.g., which may be the scheduling information included in the DCI 806) to the network entity 802A. As used herein, the term "scheduling information" may refer to information (e.g., information regarding time and frequency resources or other information) related to scheduling of a DL transmission or a UL transmission. In some aspects, the UL transmission 812 may overlap in time with the DL transmission 814. The network entity 802A may be the aggressor and the network entity 802B may be the victim. In some aspects, the network entity 802A may transmit scheduling information 808 of the DL transmission 814 (e.g., which may be may be the scheduling information included in the DCI 807) to the network entity 802B.

At 810, in various aspects that may be described in connection with FIGS. 9-16, the network entity 802A, the network entity 802B, the UE 804A, or the UE 804B may perform sensing. In some aspects, if the sensing is performed at the UE 804A or the UE 804B, a result of the sensing may be transmitted to the network entity 802A or the network entity 802B. In some aspects, based on the sensing, the network entity 802A or the network entity 802B may or may not adjust transmission of the UL transmission 812 or adjust the reception of the DL transmission 814. As used herein, the term "sensing" or "sensing operation" may refer to measuring various metrics, such as reference signal received power (RSRP) or a received signal strength indicator (RSSI), of one or more transmissions between other UEs, other network entities, or other UEs and other network entities.

In some aspects, the aggressor network entity 802A may perform sensing for the UL transmission 812 from the UE 804B. In some aspects, the aggressor network entity 802A may perform sensing based on the victim network entity 802B has a higher priority than the aggressor network entity 802A (e.g., a higher priority based on a RRC U symbol of the victim network entity 802B). In some aspects, to facilitate the sensing, the scheduling information 808 may be transmitted from the victim network entity 802B to the aggressor network entity 802A based on backhaul (BH) signaling (e.g., via Xn interface or F1 interface) or over-the-air (OTA) signaling.

Figure 9:
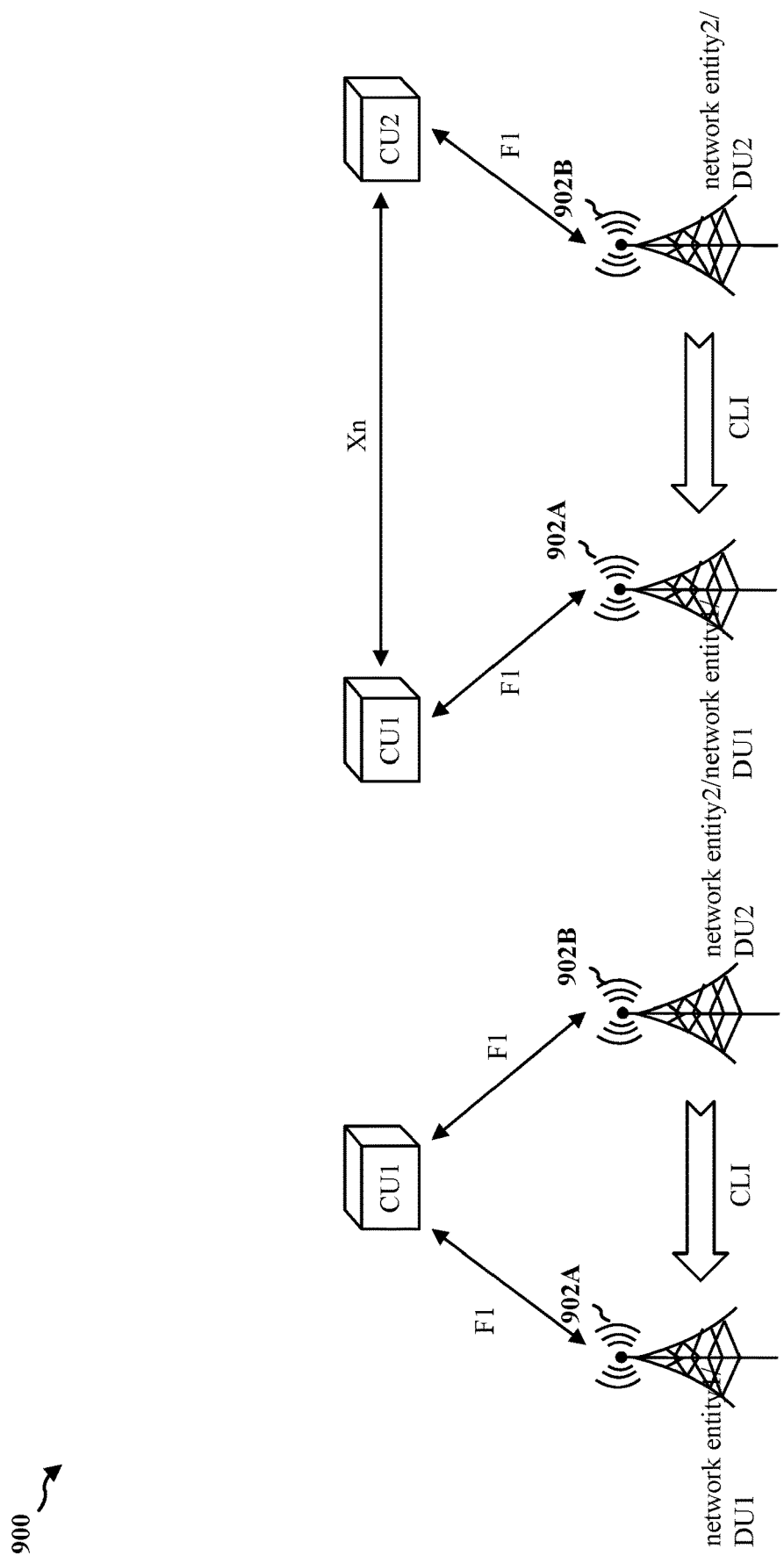
FIG. 9 is a diagram illustrating example signaling between two network entities.

FIG. 9 is a diagram 900 illustrating example signaling between two network entities. As illustrated in FIG. 9, if the first network entity 902A and the second network entity 902B belong to a same CU, F1 signaling may be used (e.g., to transmit scheduling information 808). If the first network entity 902A and the second network entity 902B belong to different CUs, F1 signaling or Xn signaling may be used (e.g., to transmit scheduling information 808).

Figure 10:
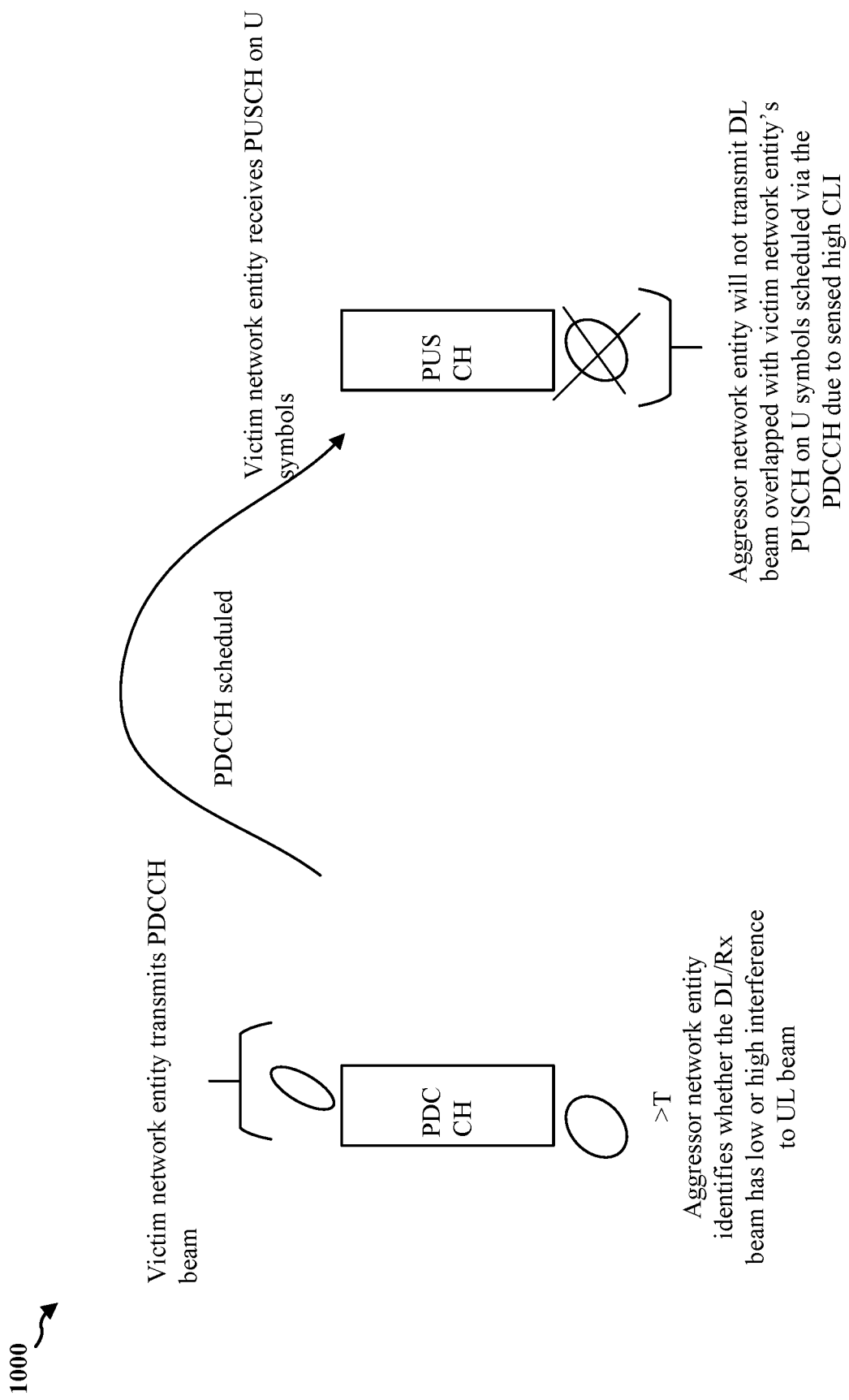
FIG. 10 is a diagram illustrating example sensing based inter-network entity CLI mitigation.
Figure 11:
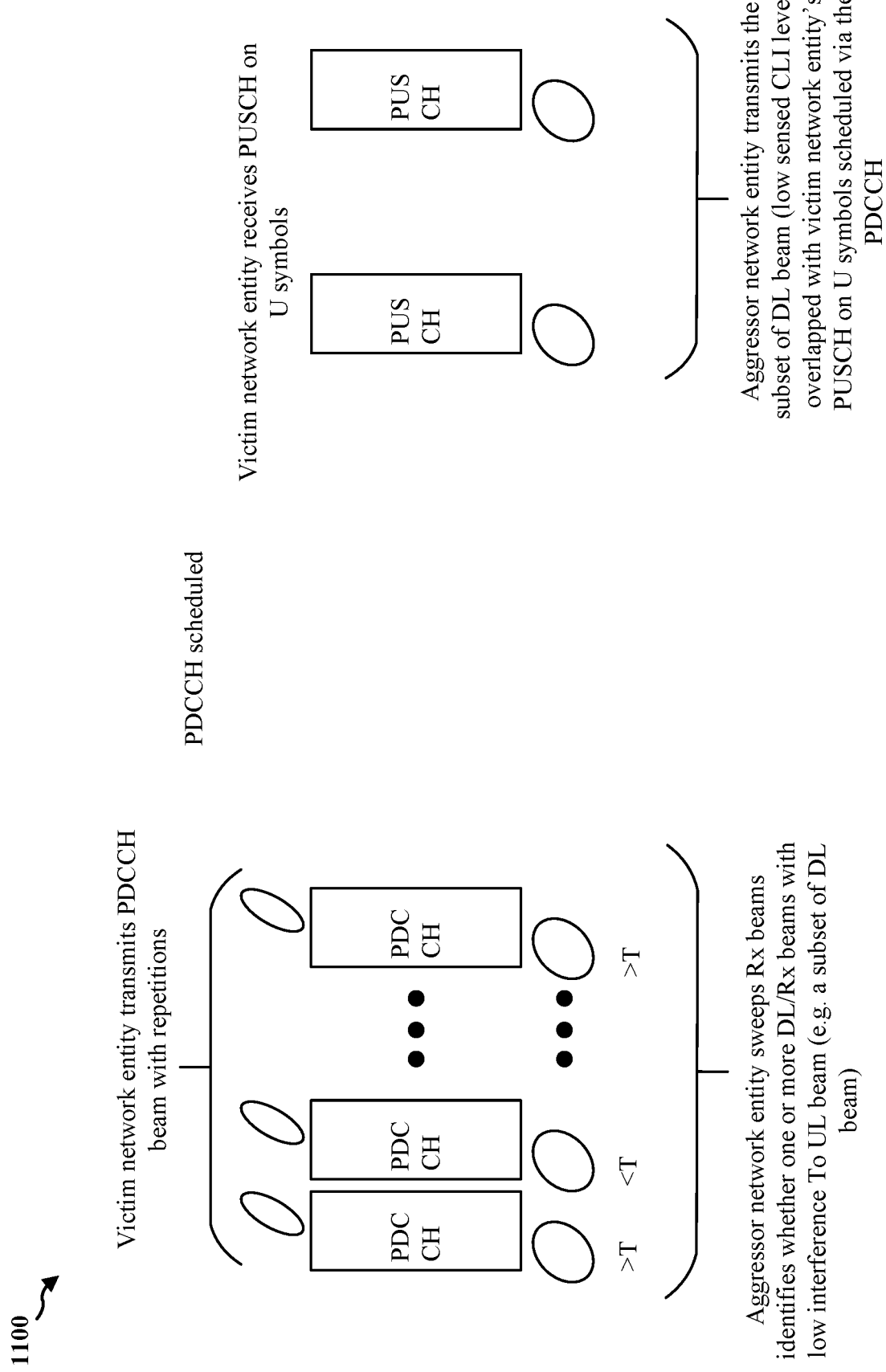
FIG. 11 is a diagram illustrating example sensing based inter-network entity CLI mitigation.

Referring back to FIG. 8, in some aspects, to perform the sensing at 810, the aggressor network entity 802A may measure (e.g., measure reference signal received power (RSRP) or a received signal strength indicator (RSSI)) the DCI (e.g., DCI 806) scheduling UL traffic of the victim network entity 802B. In some aspects, if the measured RSRP or RSSI is below a threshold, the aggressor network entity 802A may continue with the DL transmission 814 which may overlap with the UL transmission 812. In some aspects, if the measured RSRP or RSSI is above a threshold, the aggressor network entity 802A may adjust transmission of the DL transmission 814 based on one or more of: back off transmit power associated with the DL transmission 814 in a time window overlapping with the UL transmission 812, switch a transmit beam of the DL transmission 814 (e.g., to be non-overlapping in space with a transmit beam associated with the UL transmission 812), or refrain from scheduling (or cancel) the DL transmission 814 in the time window overlapping with the UL transmission 812. FIG. 10 is a diagram 1000 illustrating such example sensing based inter-network entity CLI mitigation. As illustrated in FIG. 10, the victim network entity may transmit a PDCCH beam for the DL transmission. Based on the measured RSRP or RSSI, the aggressor network entity may identify whether the DL transmission has low or high interference to the UL beam and may avoid transmitting DL beam overlapped with victim network entity's PUSCH on U symbols scheduled via the PDCCH due to sensed high CLI (based on the measured RSRP or RSSI being above a threshold). Similarly, FIG. 11 is a diagram 1100 illustrating example sensing based inter-network entity CLI mitigation. The aggressor network entity may sweep Rx beams and identify whether one or more DL/Rx beams with low interference to UL beam (e.g., a subset of DL beam), and the aggressor network entity may accordingly transmit the subset of DL beam without transmitting other DL beams.

In some aspects, to perform the sensing at 810, the aggressor network entity 802A may measure the scheduled UL traffic (e.g., the UL transmission 812) of the victim network entity 802B. In some aspects, if the measured RSRP or RSSI is below a threshold, the aggressor network entity 802A may continue with the DL transmission 814 which may overlap with the UL transmission 812. In some aspects, if the measured RSRP or RSSI is above a threshold, the aggressor network entity 802A may adjust transmission of the DL transmission 814 based on one or more of: back off transmit power associated with the DL transmission 814 in a time window overlapping with the UL transmission 812, switch a transmit beam of the DL transmission 814 (e.g., to be non-overlapping in space with a transmit beam associated with the UL transmission 812), or refrain from scheduling (or cancel) the DL transmission 814 in the time window overlapping with the UL transmission 812. In some aspects, if the UL traffic is a periodic configured grant (CG) or other semi-persistent or periodic transmissions (e.g., SRS), then the aggressor network entity 802A may sense a first symbol for each CG occasion or each semi-persistent or periodic occasion. The scheduled CG occasions may be included in the scheduling information 808.

Figure 22:
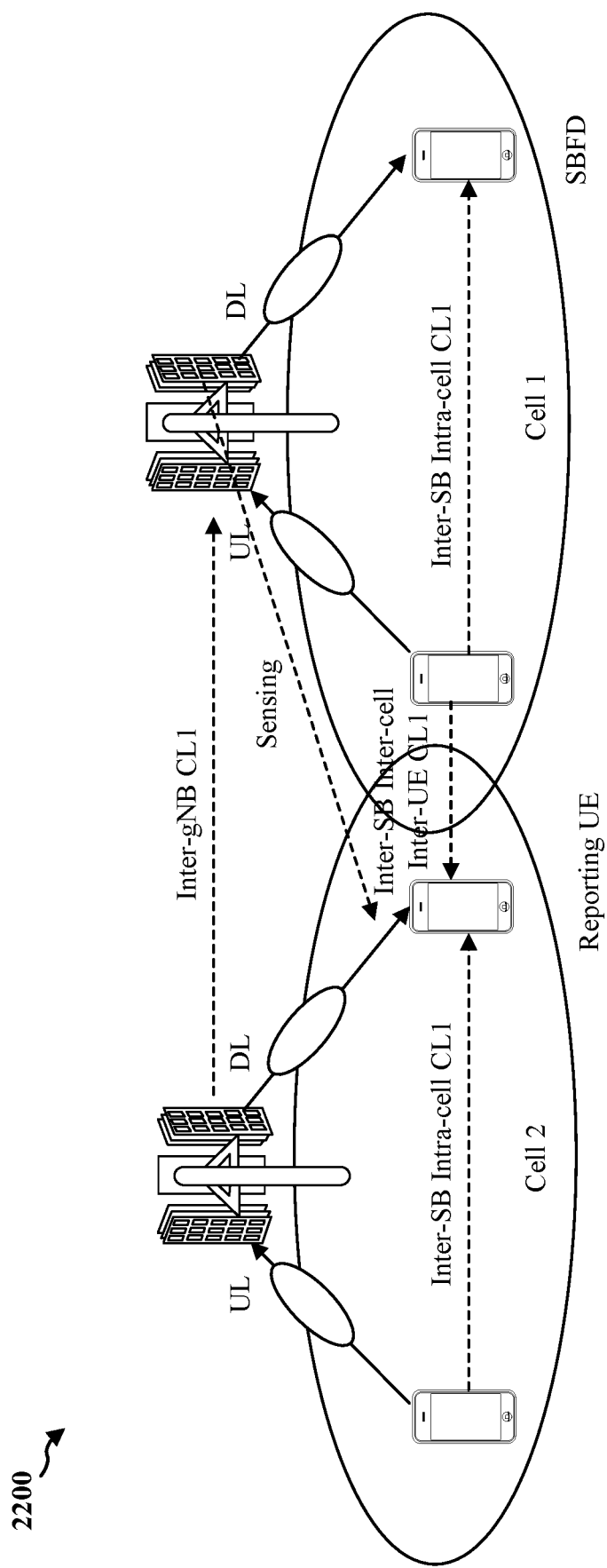
FIG. 22 is a diagram illustrating example sensing based inter-network entity CLI mitigation.

In some aspects, the sensing may be performed at the UE 804A and the result of the sensing may be transmitted from the UE 804A to the network entity 802A. In some aspects, the sensing at the UE 804A may be based on the DCI 806 or an SSB associated with the network entity 802B. In some aspects, to facilitate the sensing at the UE 804A, the UE 804A may receive the scheduling information 808 from the network entity 802A. FIG. 22 is a diagram 2200 illustrating example sensing based inter-network entity CLI mitigation. As illustrated in FIG. 22, the UE performing and reporting the sensing may be the UE served by the aggressor network entity.

In some aspects, the victim network entity 802B may perform sensing at 810. In some aspects, the victim network entity 802B may perform sensing based on the aggressor network entity 802A has a higher priority than the victim network entity 802B (e.g., a higher priority based on an RRC U symbol of the aggressor network entity 802A). In some aspects, to facilitate the sensing, the scheduling information 808 may be transmitted from the aggressor network entity 802A to the victim network entity 802B based on BH signaling (e.g., via Xn interface or F1 interface) or OTA signaling. In some aspects, the sensing may be based on measuring RSRP or RSSI of the DCI 807 or measuring RSRP or RSSI of the DL traffic (e.g., the DL transmission 814). In some aspects, if the DL traffic is a periodic CG or other semi-persistent or periodic transmissions (e.g., CSI-RS), then the victim network entity 802B may sense a first symbol for each CG occasion or each semi-persistent or periodic occasion. The scheduled CG occasions may be included in the scheduling information 808. In some aspects, if the measured RSRP or RSSI is below a threshold, the victim network entity 802B may continue with the UL transmission 812 which may overlap with the DL transmission 814. In some aspects, if the measured RSRP or RSSI is above a threshold, the victim network entity 802B may adjust reception of the UL transmission 812 based on one or more of: switch a reception beam of the UL transmission 812 (e.g., to be non-overlapping in space with a transmit beam associated with the DL transmission 814), or refrain from scheduling (or cancel) the UL transmission 812 in the time window overlapping with the DL transmission 814.

Figure 12:
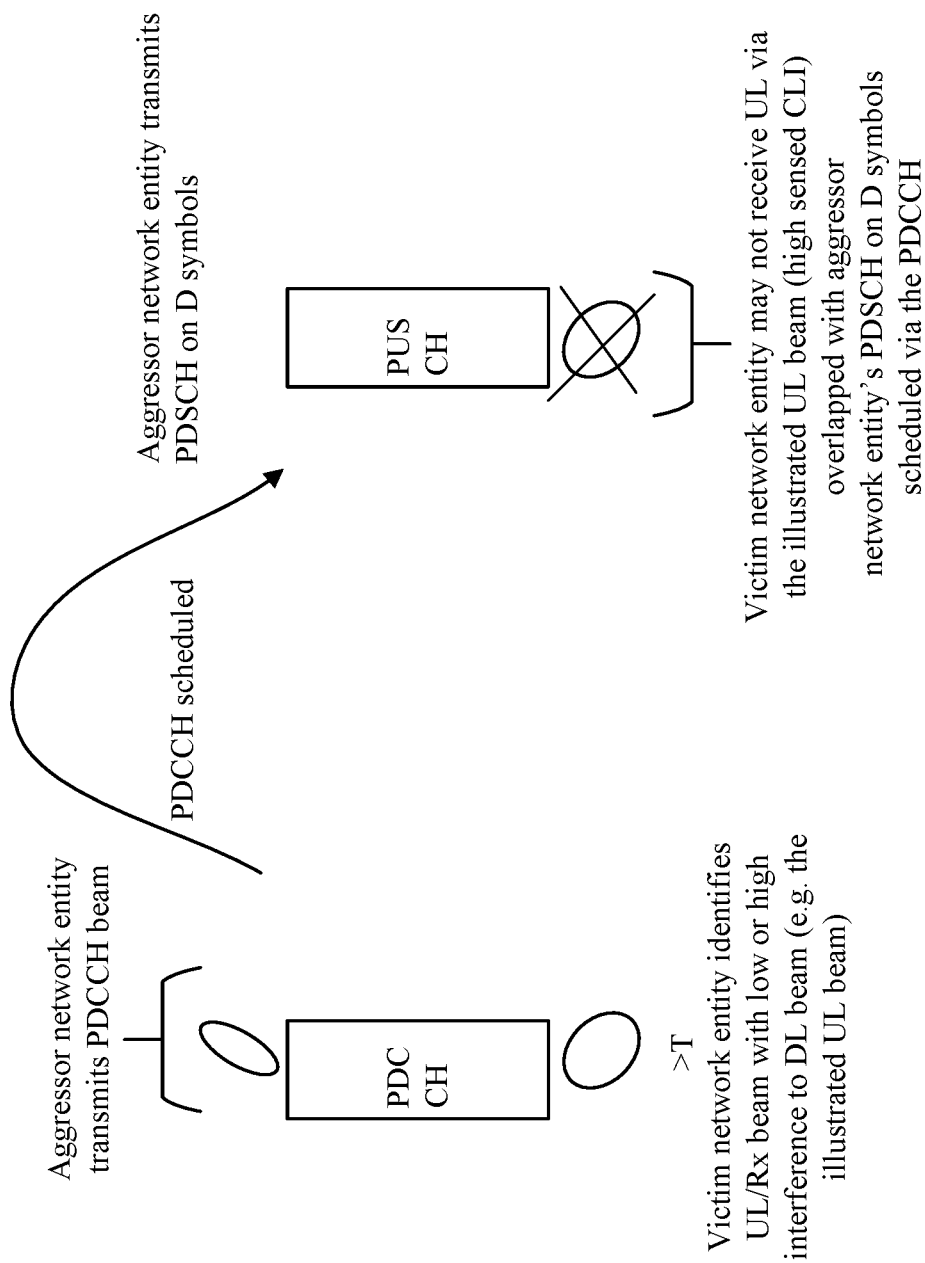
FIG. 12 is a diagram illustrating example sensing based inter-network entity CLI mitigation.

FIG. 12 is a diagram 1200 illustrating example sensing based inter-network entity CLI mitigation. As illustrated in FIG. 12, the aggressor network entity may transmit PDCCH beam and the victim network entity may UL/Rx beam with low or high interference to DL beam (e.g., the illustrated UL beam). The victim network entity may not receive UL via the illustrated UL beam (e.g., based on high sensed CLI) overlapped with aggressor network entity's PDSCH on D symbols scheduled via the PDCCH.

Figure 13:
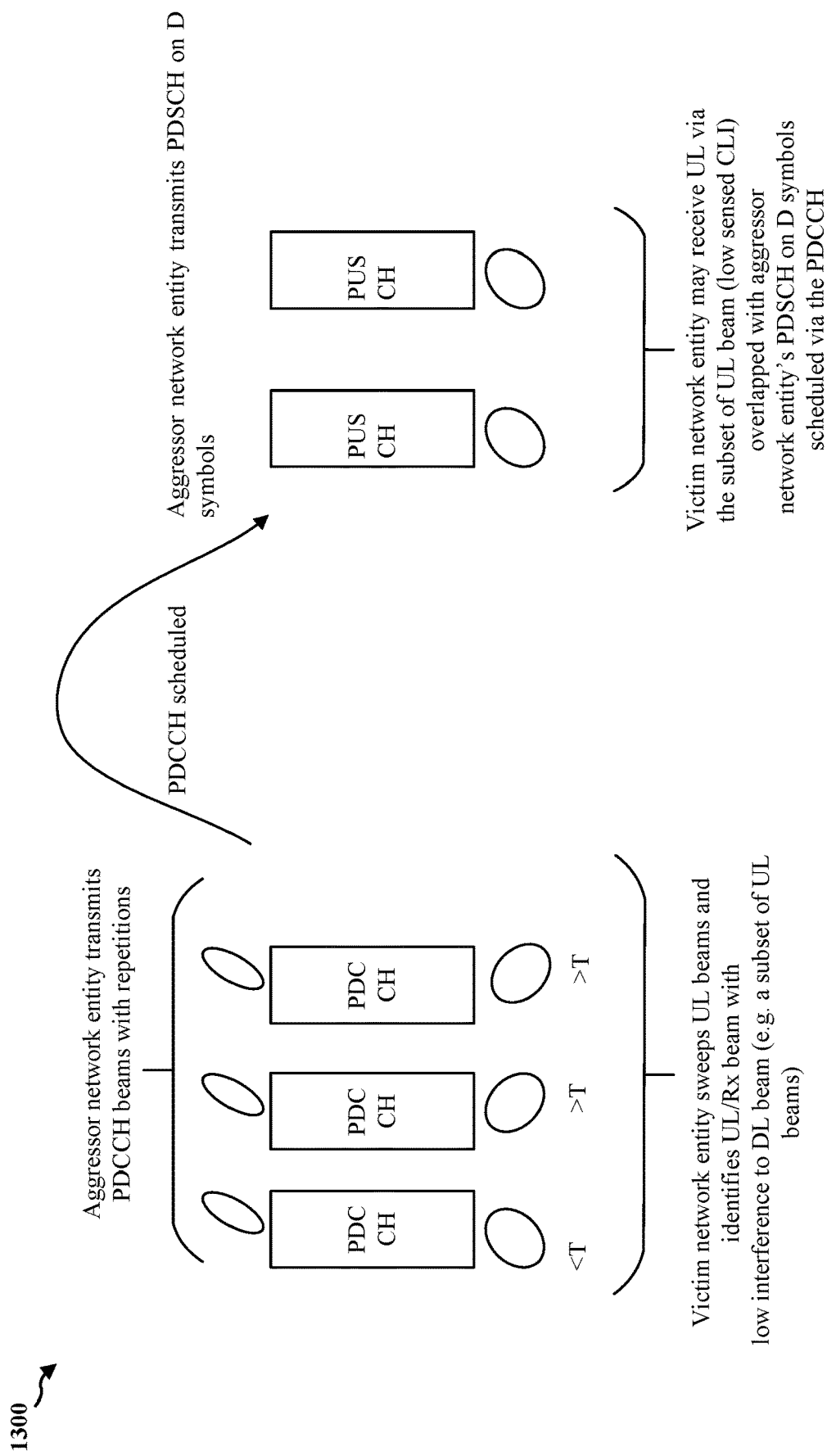
FIG. 13 is a diagram illustrating example sensing based inter-network entity CLI mitigation.

FIG. 13 is a diagram 1300 illustrating example sensing based inter-network entity CLI mitigation. The victim network entity sweeps UL beams and identifies UL/Rx beam with low interference to DL beam (e.g., a subset UL beams)

and the victim network entity may receive UL via the subset of UL beam (low sensed CLI) overlapped with aggressor network entity's PDSCH on D symbols scheduled via the PDCCH.

Figure 23:
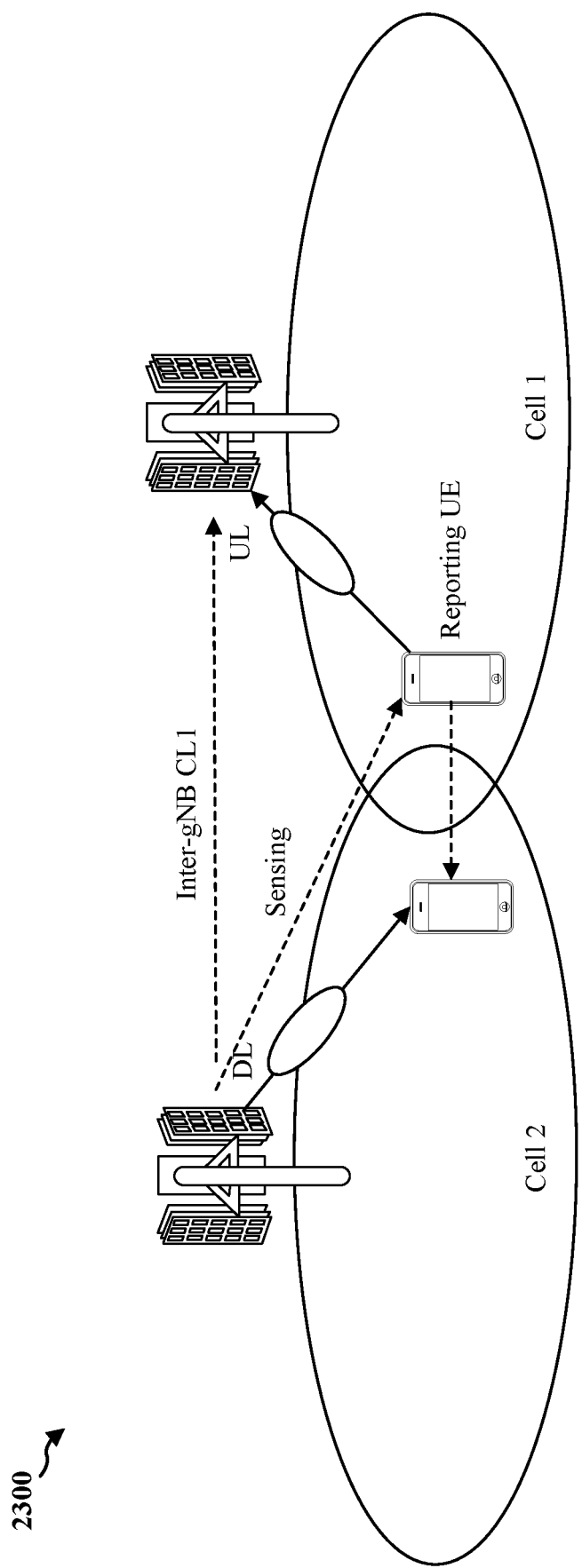
FIG. 23 is a diagram illustrating example sensing based inter-network entity CLI mitigation.

In some aspects, the sensing may be performed at the UE 804B and the result of the sensing may be transmitted from the UE 804B to the network entity 802B. In some aspects, the sensing at the UE 804B may be based on the DCI 807 or an SSB associated with the network entity 802A. In some aspects, to facilitate the sensing at the UE 804B, the UE 804B may receive the scheduling information 808 from the network entity 802B. FIG. 23 is a diagram 2300 illustrating example sensing based inter-network entity CLI mitigation. As illustrated in FIG. 23, the UE performing and reporting the sensing may be the UE served by the victim network entity.

Figure 14:
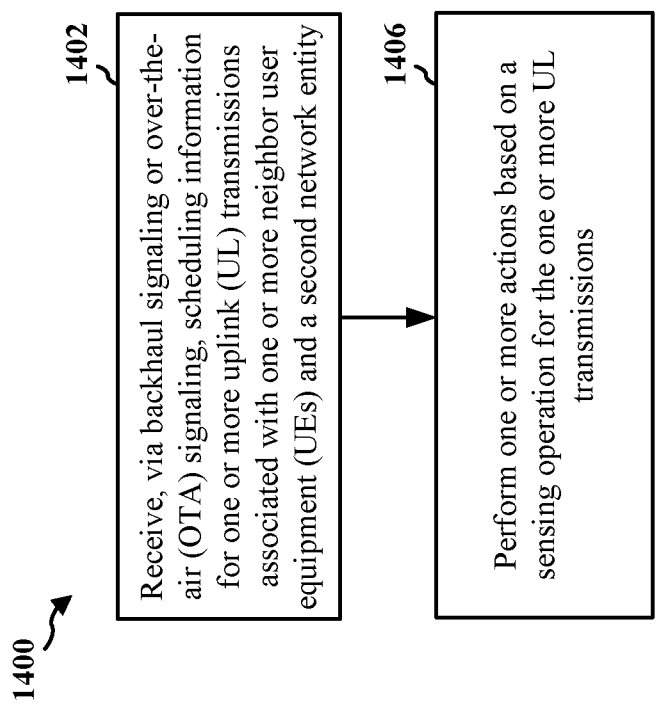
FIG. 14 is a diagram illustrating example sensing based inter-network entity CLI mitigation.

FIG. 14 is a flowchart 1400 of a method of wireless communication. The method may be performed by a network entity (e.g., the base station 102, the network entity 802A, the network entity 2002, the network entity 2102).

At 1402, the network entity may receive, via backhaul signaling or over-the-air (OTA) signaling, scheduling information for one or more UL transmissions associated with one or more neighbor UEs and a second network entity. For example, the network entity 802A may receive, via backhaul signaling or over-the-air (OTA) signaling, scheduling information 808 for one or more UL transmissions (e.g., 812) associated with one or more neighbor UEs and a network entity 802B. In some aspects, 1402 may be performed by the sensing component 199.

At 1406, the network entity may perform one or more actions based on a sensing operation for the one or more UL transmissions. For example, the network entity 802A may perform one or more actions (e.g., adjust transmission or continue transmission of the DL transmission 814) based on a sensing operation for the one or more UL transmissions (e.g., 812). In some aspects, 1406 may be performed by the sensing component 199. In some aspects, the one or more action may be one or more of: continuing with a DL transmission, backing off a transmit power associated with a DL transmission in a time window associated with the one or more UL transmissions, switching a first transmit beam of the DL transmission to be non-overlapping with a second transmit beam associated with the one or more UL transmissions, or refraining from scheduling the DL transmission in the time window associated with the one or more UL transmissions, and where the DL transmission is overlapping in a time domain with the one or more UL transmissions based on a dynamic TDD or full-duplex.

Figure 15:
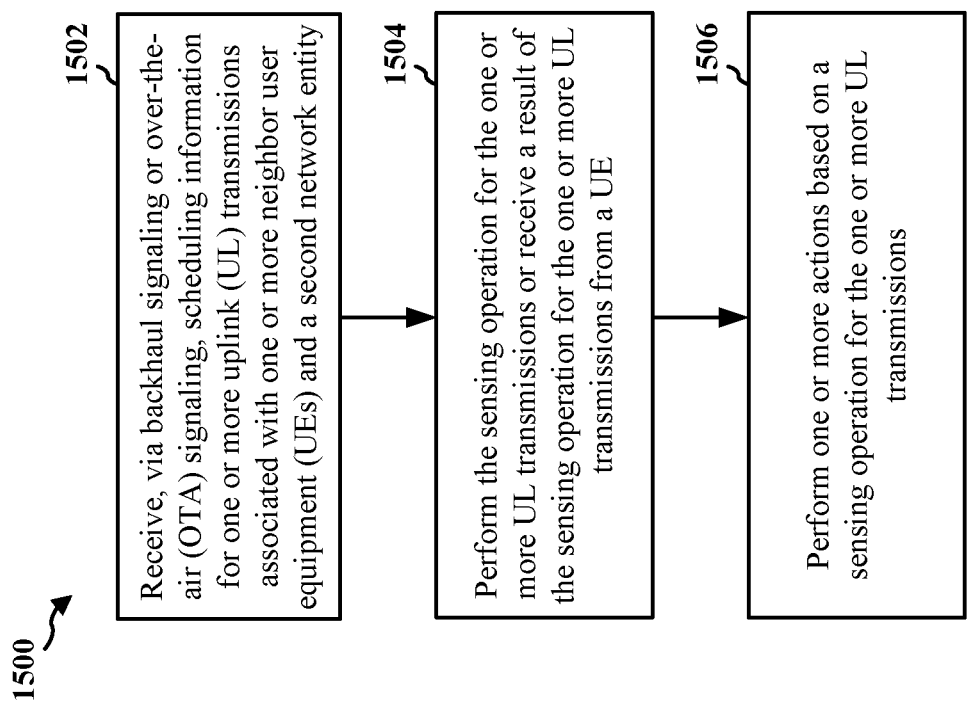
FIG. 15 is a flowchart of a method of wireless communication.

FIG. 15 is a flowchart 1500 of a method of wireless communication. The method may be performed by a network entity (e.g., the base station 102, the network entity 802A, the network entity 2002, the network entity 2102).

At 1502, the network entity may receive, via backhaul signaling or over-the-air (OTA) signaling, scheduling information for one or more UL transmissions associated with one or more neighbor UEs and a second network entity. For example, the network entity 802A may receive, via backhaul signaling or over-the-air (OTA) signaling, scheduling information 808 for one or more UL transmissions (e.g., 812) associated with one or more neighbor UEs and a network entity 802B. In some aspects, 1502 may be performed by the sensing component 199. In some aspects, the scheduling information is received via the backhaul signaling. In some aspects, the scheduling information is received via the OTA signaling.

At 1504, the network entity may perform the sensing operation for the one or more UL transmissions or receive a result of the sensing operation for the one or more UL transmissions from a UE, where the UE is served by the first network entity and is different from the one or more neighbor UEs. For example, at 810, the network entity 802A may perform the sensing operation for the one or more UL transmissions or receive a result of the sensing operation for the one or more UL transmissions from a UE, where the UE is served by the first network entity and is different from the one or more neighbor UEs, and where the sensing operation is based on DCI including the scheduling information or another DL transmission. In some aspects, 1504 may be performed by the sensing component 199. In some aspects, the sensing operation is based on measuring a RSRP or a RSSI of DCI associated with the scheduling information, and where the one or more actions correspond to, based on the RSSI or the RSRP being above a threshold, one or more of: backing off a transmit power associated with a DL transmission in a time window associated with the one or more UL transmissions, switching a first transmit beam of the DL transmission to be non-overlapping with a second transmit beam associated with the one or more UL transmissions, or refraining from scheduling the DL transmission in the time window associated with the one or more UL transmissions, and where the DL transmission is overlapping in a time domain with the one or more UL transmissions based on a dynamic TDD or full-duplex. In some aspects, the sensing operation is based on measuring a RSRP or a RSSI of DCI associated with the scheduling information, and where the one or more actions correspond to, based on the RSSI or the RSRP being below a threshold, transmitting a DL transmission in a time window associated with the one or more UL transmissions, and where the DL transmission is overlapping in a time domain with the one or more UL transmissions based on a dynamic TDD or full-duplex. In some aspects, the sensing operation is based on measuring a RSRP or a RSSI of the one or more UL transmissions, and where the one or more actions correspond to, based on the RSSI or the RSRP being above a threshold, one or more of: backing off a transmit power associated with a DL transmission in a time window associated with the one or more UL transmissions, switching a first transmit beam of the DL transmission to be non-overlapping with a second transmit beam associated with the one or more UL transmissions, or refraining from scheduling the DL transmission in the time window associated with the one or more UL transmissions, and where the DL transmission is overlapping in a time domain with the one or more UL transmissions based on a dynamic TDD or full-duplex. In some aspects, the sensing operation is based on measuring a RSRP or a RSSI of the one or more UL transmissions, and where the one or more actions correspond to, based on the RSSI or the RSRP being below a threshold, transmitting a DL transmission in a time window associated with the one or more UL transmissions, and where the DL transmission is overlapping in a time domain with the one or more UL transmissions based on a dynamic TDD or full-duplex. In some aspects, the result of the sensing operation is based on a RSRP or a RSSI of DCI associated with the scheduling information, and where the one or more actions correspond to, based on the RSSI or the RSRP being above a threshold, one or more of: backing off a transmit power associated with a DL transmission in a time window associated with the one or more UL transmissions, switching a first transmit beam of the DL transmission to be non-overlapping with a second transmit beam associated with the one or more UL transmissions, or refraining from scheduling the DL transmission in the time window associated with the one or more UL transmissions, and where the DL transmission is overlapping in a time domain with the one or more UL transmissions based on a dynamic TDD or full-duplex. In some aspects, the result of the sensing operation is based on a RSRP or a RSSI of DCI associated with the scheduling information, and where the one or more actions correspond to, based on the RSSI or the RSRP being below a threshold, transmitting a DL transmission in a time window associated with the one or more UL transmissions, and where the DL transmission is overlapping in a time domain with the one or more UL transmissions based on a dynamic TDD or full-duplex. In some aspects, the result of the sensing operation is based on a RSRP or a RSSI of SSB associated with the second network entity, and where the one or more actions correspond to, based on the RSSI or the RSRP being above a threshold, one or more of: backing off a transmit power associated with a DL transmission in a time window associated with the one or more UL transmissions, switching a first transmit beam of the DL transmission to be non-overlapping with a second transmit beam associated with the one or more UL transmissions, or refraining from scheduling the DL transmission in the time window associated with the one or more UL transmissions, and where the DL transmission is overlapping in a time domain with the one or more UL transmissions based on a dynamic TDD or full-duplex. In some aspects, the result of the sensing operation is based on a RSRP or a RSSI of SSB associated with the second network entity, and where the one or more actions correspond to, based on the RSSI or the RSRP being below a threshold, transmitting a DL transmission in a time window associated with the one or more UL transmissions, and where the DL transmission is overlapping in a time domain with the one or more UL transmissions based on a dynamic TDD or full-duplex.

At 1506, the network entity may perform one or more actions based on a sensing operation for the one or more UL transmissions. For example, the network entity 802A may perform one or more actions (e.g., adjust transmission or continue transmission of the DL transmission 814) based on a sensing operation for the one or more UL transmissions (e.g., 812). In some aspects, 1506 may be performed by the sensing component 199.

Figure 16:
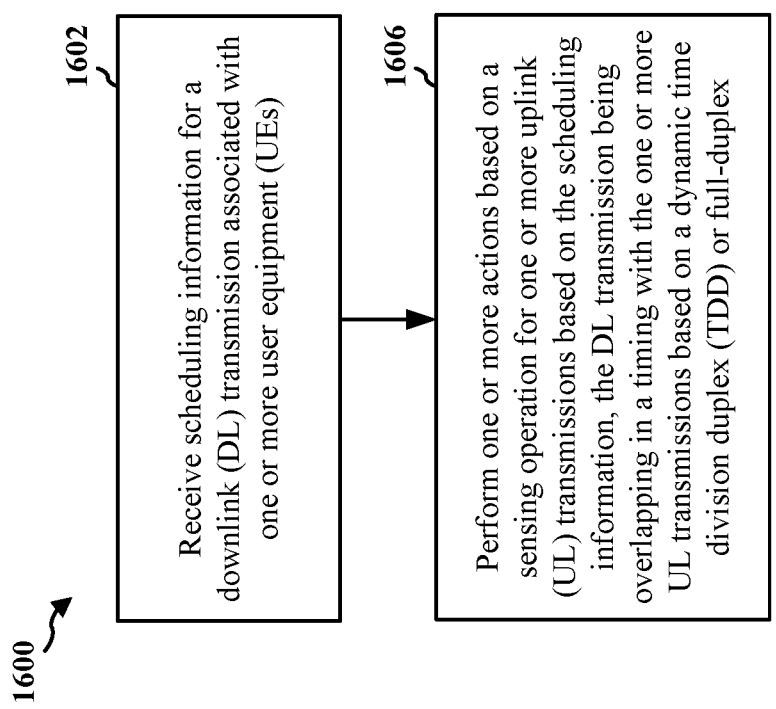
FIG. 16 is a flowchart of a method of wireless communication.

FIG. 16 is a flowchart 1600 of a method of wireless communication. The method may be performed by a network entity (e.g., the base station 102, the network entity 802B, the network entity 2002, the network entity 2102).

At 1602, the network entity may receive scheduling information for a DL transmission associated with one or more UEs. For example, the network entity 802B may transmit scheduling information 808 for a DL transmission (e.g., 814) associated with one or more UEs. In some aspects, 1602 may be performed by the sensing component 199.

At 1606, the network entity may perform one or more actions based on a sensing operation for one or more UL transmissions based on the scheduling information, the DL transmission being overlapping in a timing with the one or more UL transmissions based on a dynamic TDD or full-duplex. For example, the network entity 802B may perform one or more actions (e.g., adjust reception or continue reception of the UL transmission 812) based on a sensing operation for the one or more UL transmissions (e.g., 812) based on the scheduling information, the DL transmission being overlapping in a timing with the one or more UL transmissions based on a dynamic TDD or full-duplex. In some aspects, 1606 may be performed by the sensing component 199.

Figure 17:
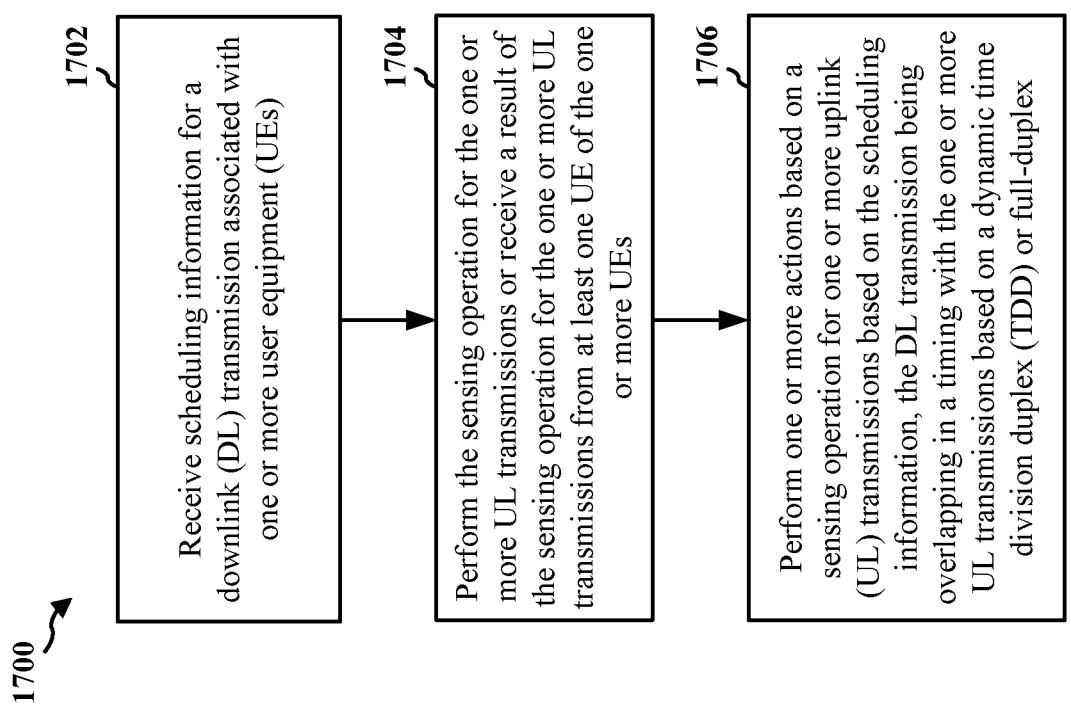
FIG. 17 is a flowchart of a method of wireless communication.

FIG. 17 is a flowchart 1700 of a method of wireless communication. The method may be performed by a network entity (e.g., the base station 102, the network entity 802B, the network entity 2002, the network entity 2102).

At 1702, the network entity may receive scheduling information for a DL transmission associated with one or more UEs. For example, the network entity 802B may transmit scheduling information 808 for a DL transmission (e.g., 814) associated with one or more UEs. In some aspects, 1702 may be performed by the sensing component 199. In some aspects, the scheduling information is transmitted via backhaul signaling. In some aspects, the scheduling information is transmitted via over-the-air (OTA) signaling.

At 1704, the network entity may perform the sensing operation for one or more UL transmissions or receive a result of the sensing operation for one or more UL transmissions from at least one UE of the one or more UEs. For example, at 810, the network entity 802B may perform the sensing operation for one or more UL transmissions or receive a result of the sensing operation for one or more UL transmissions from at least one UE of the one or more UEs. In some aspects, 1704 may be performed by the sensing component 199. In some aspects, the sensing operation is based on measuring a RSRP or a RSSI of DCI associated with a DL transmission associated with a second network entity, and where the one or more actions correspond to, based on the RSSI or the RSRP being above a threshold, one or more of: switching a first transmit beam of the one or more UL transmissions to be non-overlapping with a second transmit beam associated with the DL transmission or refraining from scheduling the one or more UL transmissions in the time window associated with the DL transmission. In some aspects, the sensing operation is based on measuring a RSRP or a RSSI of DCI associated with a DL transmission associated with a second network entity, and where the one or more actions correspond to, based on the RSSI or the RSRP being below a threshold, receiving the one or more UL transmissions. In some aspects, the sensing operation is based on measuring a RSRP or a RSSI of a first symbol of a SPS occasion associated with a DL transmission associated with a second network entity, and where the one or more actions correspond to, based on the RSSI or the RSRP being above a threshold, one or more of: switching a first transmit beam of the one or more UL transmissions to be non-overlapping with a second transmit beam associated with the DL transmission or refraining from scheduling the one or more UL transmissions in the time window associated with the DL transmission. In some aspects, the sensing operation is based on measuring a RSRP or a RSSI of a first symbol of a SPS occasion, and where the one or more actions correspond to, based on the RSSI or the RSRP being below a threshold, receiving the one or more UL transmissions. In some aspects, the result of the sensing operation is based on a RSRP or a RSSI of DCI associated with a DL transmission associated with a second network entity, and where the one or more actions correspond to, based on the RSSI or the RSRP being above a threshold, one or more of: switching a first transmit beam of the one or more UL transmissions to be non-overlapping with a second transmit beam associated with the DL transmission or refraining from scheduling the one or more UL transmissions in the time window associated with the DL transmissions. In some aspects, the result of the sensing operation is based on a RSRP or a RSSI of DCI associated with a DL transmission associated with a second network entity, and where the one or more actions correspond to, based on the RSSI or the RSRP being below a threshold, receiving the one or more UL transmissions. In some aspects, the result of the sensing operation is based on a RSRP or a RSSI of a SSB, and where the one or more actions correspond to, based on the RSSI or the RSRP being above a threshold, one or more of: switching a first transmit beam of the one or more UL transmissions to be non-overlapping with a second transmit beam associated with the DL transmission or refraining from scheduling the one or more UL transmissions in the time window associated with the DL transmission. In some aspects, the result of the sensing operation is based on a RSRP or a RSSI of a SSB associated with a DL transmission associated with a second network entity, and where the one or more actions correspond to, based on the RSSI or the RSRP being below a threshold, receiving the one or more UL transmissions.

At 1706, the network entity may perform one or more actions based on a sensing operation for the one or more UL transmissions based on the scheduling information, the DL transmission being overlapping in a timing with the one or more UL transmissions based on a dynamic TDD or full-duplex. For example, the network entity 802B may perform one or more actions (e.g., adjust reception or continue reception of the UL transmission 812) based on a sensing operation for the one or more UL transmissions (e.g., 812) based on the scheduling information, the DL transmission being overlapping in a timing with the one or more UL transmissions based on a dynamic TDD or full-duplex. In some aspects, 1706 may be performed by the sensing component 199.

Figure 18:
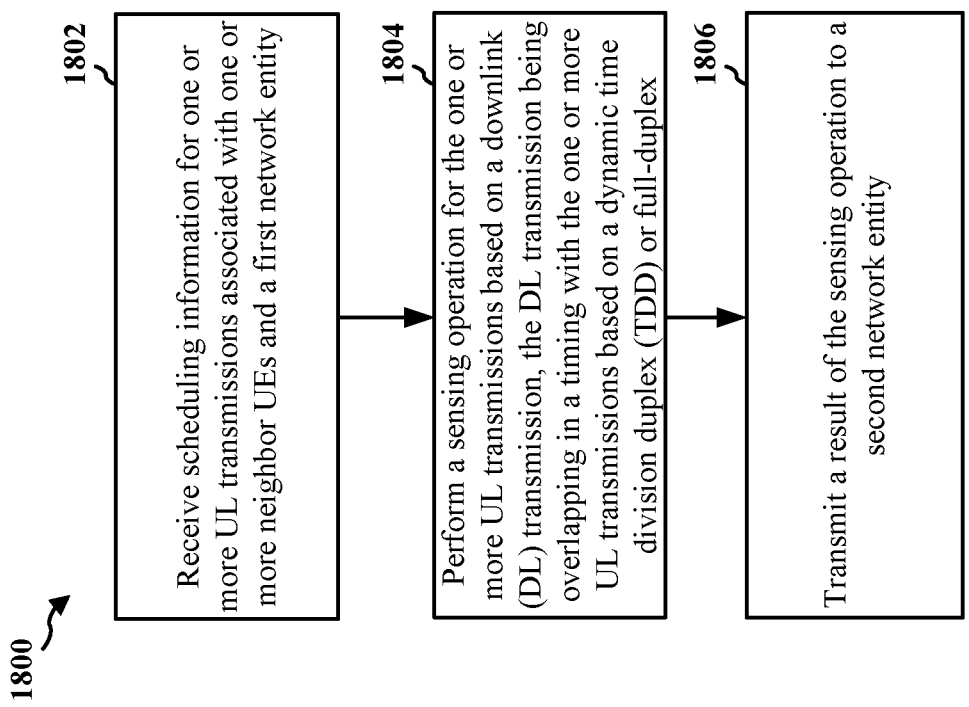
FIG. 18 is a flowchart of a method of wireless communication.

FIG. 18 is a flowchart 1800 of a method of wireless communication. The method may be performed by a UE (e.g., the UE 104, the UE 804A; the apparatus 2004).

At 1802, the UE may receive scheduling information for one or more UL transmissions associated with one or more neighbor UEs and a first network entity. For example, the UE 804A may receive scheduling information 808 for one or more UL transmissions associated with one or more neighbor UEs and a network entity 802B. In some aspects, 1802 may be performed by sensing component 198.

At 1804, the UE may perform a sensing operation for the one or more UL transmissions based on a DL transmission, the DL transmission being overlapping in a timing with the one or more UL transmissions based on a dynamic TDD or full-duplex. For example, the UE 804A may, at 810, perform a sensing operation for the one or more UL transmissions based on a DL transmission, the DL transmission being overlapping in a timing with the one or more UL transmissions based on a dynamic TDD or full-duplex. In some aspects, 1804 may be performed by sensing component 198.

At 1806, the UE may transmit a result of the sensing operation to a second network entity. For example, the UE 804A may, at 810, transmit a result of the sensing operation to a network entity 802A. In some aspects, 1806 may be performed by sensing component 198.

Figure 19:
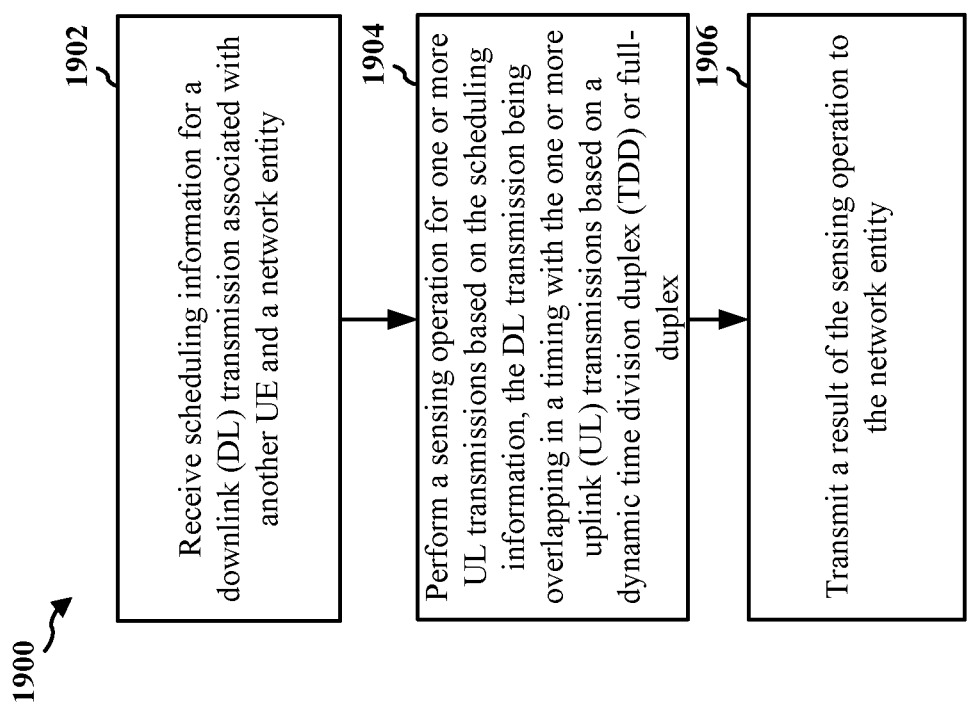
FIG. 19 is a flowchart of a method of wireless communication.

FIG. 19 is a flowchart 1900 of a method of wireless communication. The method may be performed by a UE (e.g., the UE 104, the UE 804B; the apparatus 2004).

At 1902, the UE may receive scheduling information for a DL transmission associated with another UE and a network entity. For example, the UE 804B may receive scheduling information 808 for a DL transmission associated with another UE 804A and a network entity 802A. In some aspects, 1902 may be performed by sensing component 198.

At 1904, the UE may perform a sensing operation for one or more UL transmissions based on the scheduling information, the DL transmission being overlapping in a timing with the one or more UL transmissions based on a dynamic TDD or full-duplex. For example, the UE 804B may, at 810, perform a sensing operation for the one or more UL transmissions based on the scheduling information, the DL transmission being overlapping in a timing with the one or more UL transmissions based on a dynamic TDD or full-duplex. In some aspects, 1904 may be performed by sensing component 198.

At 1906, the UE may transmit a result of the sensing operation to the network entity. For example, the UE 804B may, at 810, transmit a result of the sensing operation to the network entity 802B. In some aspects, 1906 may be performed by sensing component 198.

Figure 20:
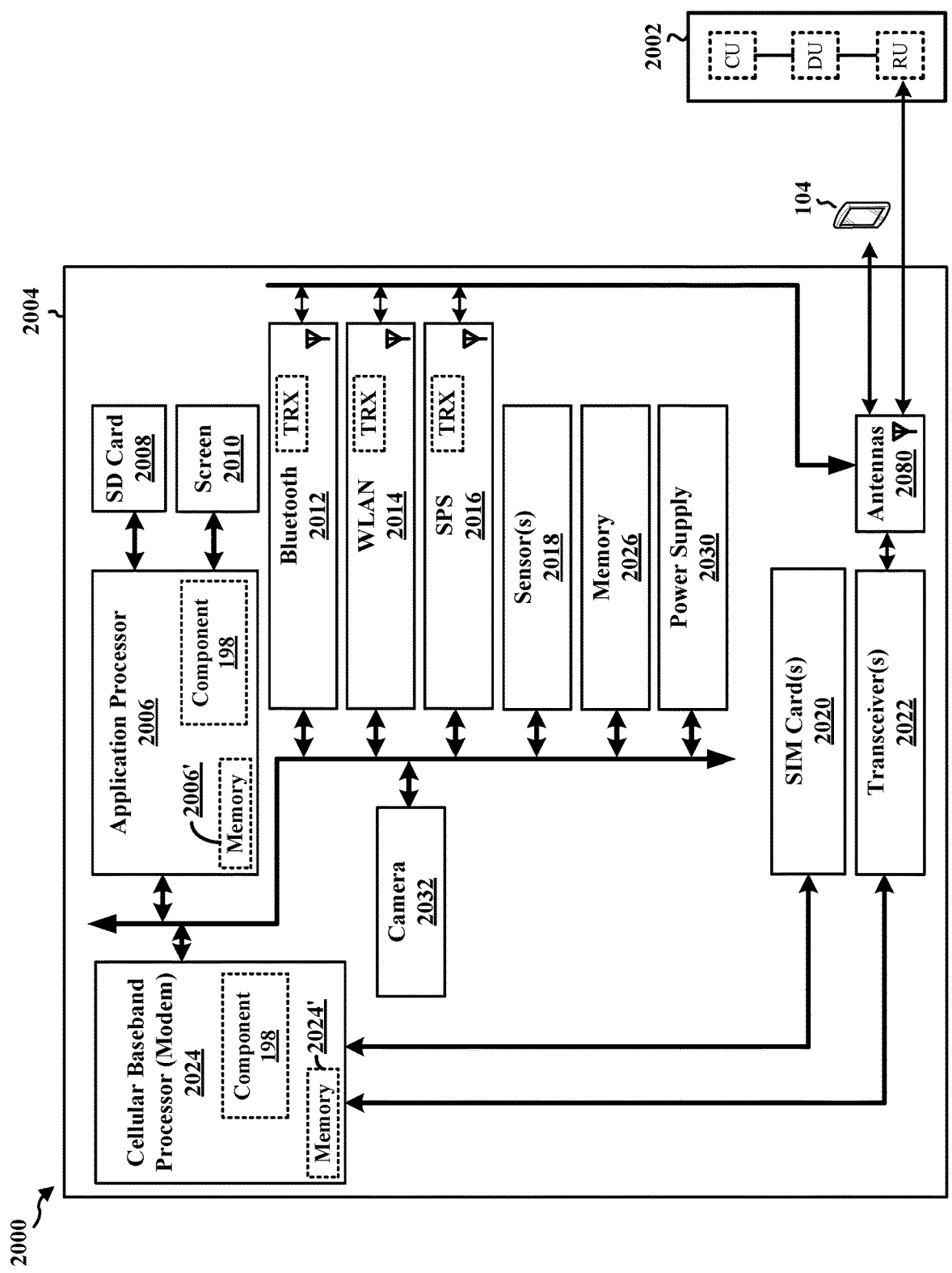
FIG. 20 is a diagram illustrating an example of a hardware implementation for an example apparatus and/or network entity.

FIG. 20 is a diagram 2000 illustrating an example of a hardware implementation for an apparatus 2004. The apparatus 2004 may be a UE, a component of a UE, or may implement UE functionality. In some aspects, the apparatus 2004 may include a cellular baseband processor 2024 (also referred to as a modem) coupled to one or more transceivers 2022 (e.g., cellular RF transceiver). The cellular baseband processor 2024 may include on-chip memory 2024'. In some aspects, the apparatus 2004 may further include one or more subscriber identity modules (SIM) cards 2020 and an application processor 2006 coupled to a secure digital (SD) card 2008 and a screen 2010. The application processor 2006 may include on-chip memory 2006'. In some aspects, the apparatus 2004 may further include a Bluetooth module 2012, a WLAN module 2014, a satellite system module 2016 (e.g., GNSS module), one or more sensor modules 2018 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2026, a power supply 2030, and/or a camera 2032. The Bluetooth module 2012, the WLAN module 2014, and the satellite system module 2016 may include an on-chip transceiver (TRX)/receiver (RX). The cellular baseband processor 2024 communicates through the transceiver(s) 2022 via one or more antennas 2080 with the UE 104 and/or with an RU associated with a network entity 2002. The cellular baseband processor 2024 and the application processor 2006 may each include a computer-readable medium/memory 2024', 2006', respectively. The additional memory modules 2026 may also be considered a computer-readable medium/memory. Each computer-readable medium/memory 2024', 2006', 2026 may be non-transitory. The cellular baseband processor 2024 and the application processor 2006 are each responsible for general processing, including the execution of software stored on the computer-readable medium/memory. The software, when executed by the cellular baseband processor 2024/application processor 2006, causes the cellular baseband processor 2024/application processor 2006 to perform the various functions described herein. The computer-readable medium/memory may also be used for storing data that is manipulated by the cellular baseband processor 2024/application processor 2006 when executing software. The cellular baseband processor 2024/application processor 2006 may be a component of the UE 350 and may include the memory 360 and/or at least one of the TX processor 368, the RX processor 356, and the controller/processor 359. In one configuration, the apparatus 2004 may be a processor chip (modem and/or application) and include just the cellular baseband processor 2024 and/or the application processor 2006, and in another configuration, the apparatus 2004 may be the entire UE (e.g., see 350 of FIG. 3) and include the additional modules of the apparatus 2004.

As discussed herein, the sensing component 198 may be configured to receive scheduling information for one or more UL transmissions associated with one or more neighbor UEs and a first network entity. The sensing component 198 may be configured to perform a sensing operation for the one or more UL transmissions based on a DL transmission, the DL transmission being overlapping in a timing with the one or more UL transmissions based on a dynamic TDD or full-duplex. The sensing component 198 may be configured to transmit a result of the sensing operation to a second network entity. The sensing component 198 may be configured to receive scheduling information for a DL transmission associated with another UE and a network entity. The sensing component 198 may be configured to perform a sensing operation for the one or more UL transmissions based on the scheduling information, the DL transmission being overlapping in a timing with the one or more UL transmissions based on a dynamic TDD or full-duplex. The sensing component 198 may be configured to transmit a result of the sensing operation to the network entity. The sensing component 198 may be within the cellular baseband processor 2024, the application processor 2006, or both the cellular baseband processor 2024 and the application processor 2006. The sensing component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 2004 may include a variety of components configured for various functions. In one configuration, the apparatus 2004, and in particular the cellular baseband processor 2024 and/or the application processor 2006, includes means for receiving scheduling information for one or more UL transmissions associated with one or more neighbor UEs and a first network entity. In some aspects, the apparatus 2004 may further include means for performing a sensing operation for the one or more UL transmissions based on the scheduling information, the DL transmission being overlapping in a timing with the one or more UL transmissions based on a dynamic TDD or full-duplex. In some aspects, the apparatus 2004 may further include means for transmitting a result of the sensing operation to a second network entity. In some aspects, the apparatus 2004 may further include means for receiving scheduling information for one or more UL transmissions associated with the UE and a network entity. In some aspects, the apparatus 2004 may further include means for performing a sensing operation for the one or more UL transmissions. In some aspects, the apparatus 2004 may further include means for transmitting a result of the sensing operation to the network entity. The means may be the sensing component 198 of the apparatus 2004 configured to perform the functions recited by the means. As described herein, the apparatus 2004 may include the TX processor 368, the RX processor 356, and the controller/processor 359. As such, in one configuration, the means may be the TX processor 368, the RX processor 356, and/or the controller/processor 359 configured to perform the functions recited by the means.

Figure 21:
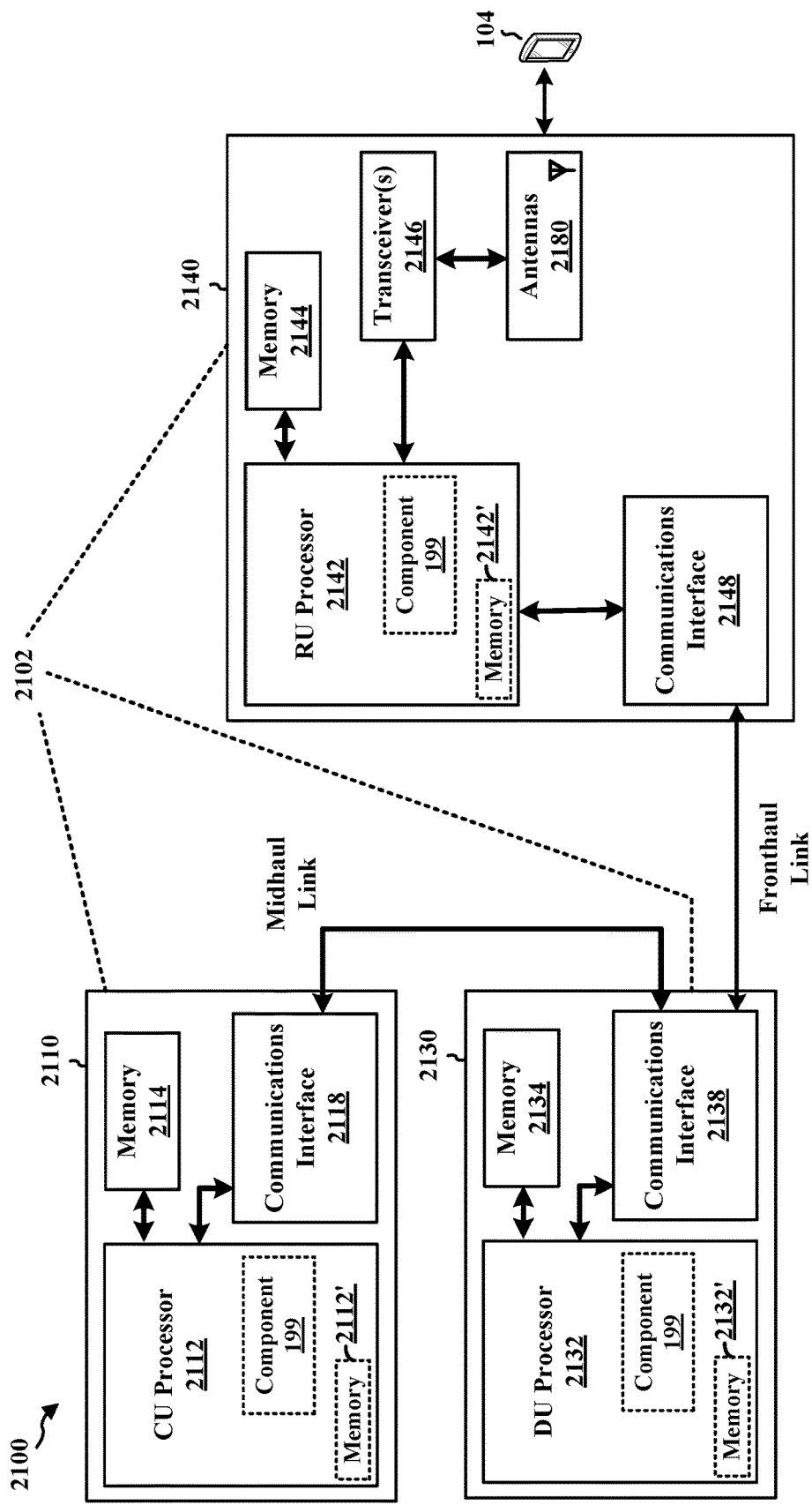
FIG. 21 is a diagram illustrating an example of a hardware implementation for an example network entity.

FIG. 21 is a diagram 2100 illustrating an example of a hardware implementation for a network entity 2102. The network entity 2102 may be a BS, a component of a BS, or may implement BS functionality. The network entity 2102 may include at least one of a CU 2110, a DU 2130, or an RU 2140. For example, depending on the layer functionality handled by the sensing component 199, the network entity 2102 may include the CU 2110; both the CU 2110 and the DU 2130; each of the CU 2110, the DU 2130, and the RU 2140; the DU 2130; both the DU 2130 and the RU 2140; or the RU 2140. The CU 2110 may include a CU processor 2112. The CU processor 2112 may include on-chip memory 2112'. In some aspects, the CU 2110 may further include additional memory modules 2114 and a communications interface 2118. The CU 2110 communicates with the DU 2130 through a midhaul link, such as an F1 interface. The DU 2130 may include a DU processor 2132. The DU processor 2132 may include on-chip memory 2132'. In some aspects, the DU 2130 may further include additional memory modules 2134 and a communications interface 2138. The DU 2130 communicates with the RU 2140 through a fronthaul link. The RU 2140 may include an RU processor 2142. The RU processor 2142 may include on-chip memory 2142'. In some aspects, the RU 2140 may further include additional memory modules 2144, one or more transceivers 2146, antennas 2180, and a communications interface 2148. The RU 2140 communicates with the UE 104. The on-chip memory 2112', 2132', 2142' and the additional memory modules 2114, 2134, 2144 may each be considered a computer-readable medium/memory. Each computer-readable medium/memory may be non-transitory. Each of the processors 2112, 2132, 2142 is responsible for general processing, including the execution of software stored on the computer-readable medium/memory. The software, when executed by the corresponding processor(s) causes the processor(s) to perform the various functions described herein. The computer-readable medium/memory may also be used for storing data that is manipulated by the processor(s) when executing software.

As discussed herein, the sensing component 199 may be configured to receive, via backhaul signaling or over-the-air (OTA) signaling, scheduling information for one or more UL transmissions associated with one or more neighbor UEs and a second network entity. The sensing component 199 may be configured to perform one or more actions based on a sensing operation for the one or more UL transmissions. The sensing component 199 may be configured to receive scheduling information for a DL transmission associated with one or more UEs. The sensing component 199 may be configured to perform one or more actions based on a sensing operation for the one or more UL transmissions based on the scheduling information, the DL transmission being overlapping in a timing with the one or more UL transmissions based on a dynamic TDD or full-duplex. The sensing component 199 may be within one or more processors of one or more of the CU 2110, DU 2130, and the RU 2140. The sensing component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2102 may include a variety of components configured for various functions. In one configuration, the network entity 2102 includes means for receiving scheduling information for one or more UL transmissions associated with one or more neighbor UEs and a second network entity. In some aspects, the network entity 2102 may further include means for performing one or more actions based on a sensing operation for the one or more UL transmissions. In some aspects, the network entity 2102 may further include means for performing the sensing operation for the one or more UL transmissions. In some aspects, the network entity 2102 may further include means for receiving a result of the sensing operation for the one or more UL transmissions from a UE, where the UE is served by the first network entity and is different from the one or more neighbor UEs, and where the sensing operation is based on DCI including the scheduling information or another DL transmission. In some aspects, the network entity 2102 may include means for receiving scheduling information for a UL transmission associated with one or more UEs. In some aspects, the network entity 2102 may further include means for performing one or more actions based on a sensing operation for one or more UL transmissions based on the scheduling information, the DL transmission being overlapping in a timing with the one or more UL transmissions based on a dynamic TDD or full-duplex. In some aspects, the network entity 2102 may further include means for performing the sensing operation for the one or more UL transmissions. In some aspects, the network entity 2102 may further include means for receiving a result of the sensing operation for the one or more UL transmissions from at least one UE of the one or more UEs. The means may be the sensing component 199 of the network entity 2102 configured to perform the functions recited by the means. As described herein, the network entity 2102 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is an apparatus for wireless communication at a first network entity, including: a memory; and at least one processor coupled to the memory and, based at least in part on information stored in the memory, the at least one processor is configured to: receive, via backhaul signaling or over-the-air (OTA) signaling, scheduling information for one or more uplink (UL) transmissions associated with one or more neighbor user equipment (UEs) and a second network entity; and perform one or more actions based on a sensing operation for the one or more UL transmissions.

Aspect 2 is the apparatus of any of aspects 1, where the at least one processor is further configured to: perform the sensing operation for the one or more UL transmissions.

Aspect 3 is the apparatus of any of aspects 1-2, where the sensing operation is based on measuring a reference signal received power (RSRP) or a received signal strength indicator (RSSI) of downlink (DL) control information (DCI) associated with the scheduling information, and where the one or more actions correspond to, based on the RSSI or the RSRP being above a threshold, one or more of: backing off a transmit power associated with a DL transmission in a time window associated with the one or more UL transmissions, switching a first transmit beam of the DL transmission to be non-overlapping with a second transmit beam associated with the one or more UL transmissions, or refraining from scheduling the DL transmission in the time window associated with the one or more UL transmissions, and where the DL transmission is overlapping in a time domain with the one or more UL transmissions based on a dynamic time division duplex (TDD) or full-duplex.

Aspect 4 is the apparatus of any of aspects 1-3, where the sensing operation is based on measuring a reference signal received power (RSRP) or a received signal strength indicator (RSSI) of downlink (DL) control information (DCI) associated with the scheduling information, and where the one or more actions correspond to, based on the RSSI or the RSRP being below a threshold, transmitting a DL transmission in a time window associated with the one or more UL transmissions, and where the DL transmission is overlapping in a time domain with the one or more UL transmissions based on a dynamic time division duplex (TDD) or full-duplex.

Aspect 5 is the apparatus of any of aspects 1-4, where the sensing operation is based on measuring a reference signal received power (RSRP) or a received signal strength indicator (RSSI) of the one or more UL transmissions, and where the one or more actions correspond to, based on the RSSI or the RSRP being above a threshold, one or more of: backing off a transmit power associated with a downlink (DL) transmission in a time window associated with the one or more UL transmissions, switching a first transmit beam of the DL transmission to be non-overlapping with a second transmit beam associated with the one or more UL transmissions, or refraining from scheduling the DL transmission in the time window associated with the one or more UL transmissions, and where the DL transmission is overlapping in a time domain with the one or more UL transmissions based on a dynamic time division duplex (TDD) or full-duplex.

Aspect 6 is the apparatus of any of aspects 1-5, where the sensing operation is based on measuring a reference signal received power (RSRP) or a received signal strength indicator (RSSI) of the one or more UL transmissions, and where the one or more actions correspond to, based on the RSSI or the RSRP being below a threshold, transmitting a downlink (DL) transmission in a time window associated with the one or more UL transmissions, and where the DL transmission is overlapping in a time domain with the one or more UL transmissions based on a dynamic time division duplex (TDD) or full-duplex.

Aspect 7 is the apparatus of any of aspects 1-6, where the at least one processor is further configured to: receive a result of the sensing operation for the one or more UL transmissions from a UE, where the UE is served by the first network entity and is different from the one or more neighbor UEs, and where the sensing operation is based on downlink control information (DCI) including the scheduling information or another downlink (DL) transmission.

Aspect 8 is the apparatus of any of aspects 1-7, where the result of the sensing operation is based on a reference signal received power (RSRP) or a received signal strength indicator (RSSI) of downlink (DL) control information (DCI) associated with the scheduling information, and where the one or more actions correspond to, based on the RSSI or the RSRP being above a threshold, one or more of: backing off a transmit power associated with a DL transmission in a time window associated with the one or more UL transmissions, switching a first transmit beam of the DL transmission to be non-overlapping with a second transmit beam associated with the one or more UL transmissions, or refraining from scheduling the DL transmission in the time window associated with the one or more UL transmissions, and where the DL transmission is overlapping in a time domain with the one or more UL transmissions based on a dynamic time division duplex (TDD) or full-duplex.

Aspect 9 is the apparatus of any of aspects 1-8, where the result of the sensing operation is based on a reference signal received power (RSRP) or a received signal strength indicator (RSSI) of downlink (DL) control information (DCI) associated with the scheduling information, and where the one or more actions correspond to, based on the RSSI or the RSRP being below a threshold, transmitting a DL transmission in a time window associated with the one or more UL transmissions.

Aspect 10 is the apparatus of any of aspects 1-9, where the result of the sensing operation is based on a reference signal received power (RSRP) or a received signal strength indicator (RSSI) of synchronization signal block (SSB) associated with the second network entity, and where the one or more actions correspond to, based on the RSSI or the RSRP being above a threshold, one or more of: backing off a transmit power associated with a downlink (DL) transmission in a time window associated with the one or more UL transmissions, switching a first transmit beam of the DL transmission to be non-overlapping with a second transmit beam associated with the one or more UL transmissions, or refraining from scheduling the DL transmission in the time window associated with the one or more UL transmissions, and where the DL transmission is overlapping in a time domain with the one or more UL transmissions based on a dynamic time division duplex (TDD) or full-duplex.

Aspect 11 is the apparatus of any of aspects 1-10, where the result of the sensing operation is based on a reference signal received power (RSRP) or a received signal strength indicator (RSSI) of synchronization signal block (SSB) associated with the second network entity, and where the one or more actions correspond to, based on the RSSI or the RSRP being below a threshold, transmitting a downlink (DL) transmission in a time window associated with the one or more UL transmissions, and where the DL transmission is overlapping in a time domain with the one or more UL transmissions based on a dynamic time division duplex (TDD) or full-duplex.

Aspect 12 is the apparatus of any of aspects 1-11, where the scheduling information is received via the backhaul signaling.

Aspect 13 is the apparatus of any of aspects 1-12, where the scheduling information is received via the OTA signaling.

Aspect 14 is the apparatus of any of aspects 1-13, further including a transceiver or an antenna coupled to the at least one processor, and where the transceiver or the antenna is configured to receive the scheduling information.

Aspect 15 is an apparatus for wireless communication at a first network entity, including: a memory; and at least one processor coupled to the memory, where the at least one processor is configured to: receive scheduling information for a downlink (DL) transmission associated with one or more user equipment (UEs); and perform one or more actions based on a sensing operation for one or more uplink (UL) transmissions based on the scheduling information, the DL transmission being overlapping in a timing with the one or more UL transmissions based on a dynamic time division duplex (TDD) or full-duplex.

Aspect 16 is the apparatus of aspect 15, where the at least one processor is further configured to: perform the sensing operation for the one or more UL transmissions.

Aspect 17 is the apparatus of any of aspects 15-16, where the sensing operation is based on measuring a reference signal received power (RSRP) or a received signal strength indicator (RSSI) of DL control information (DCI) associated with the DL transmission associated with a second network entity, and where the one or more actions correspond to, based on the RSSI or the RSRP being above a threshold, one or more of: switching a first transmit beam of the one or more UL transmissions to be non-overlapping with a second transmit beam associated with the DL transmission or refraining from scheduling the one or more UL transmissions in a time window associated with the DL transmission.

Aspect 18 is the apparatus of any of aspects 15-17, where the sensing operation is based on measuring a reference signal received power (RSRP) or a received signal strength indicator (RSSI) of DL control information (DCI) associated with the DL transmission associated with a second network entity, and where the one or more actions correspond to, based on the RSSI or the RSRP being below a threshold, receiving the one or more UL transmissions.

Aspect 19 is the apparatus of any of aspects 15-18, where the sensing operation is based on measuring a reference signal received power (RSRP) or a received signal strength indicator (RSSI) of a first symbol of a semi-persistent scheduling (SPS) occasion associated with a DL transmission associated with a second network entity, and where the one or more actions correspond to, based on the RSSI or the RSRP being above a threshold, one or more of: switching a first transmit beam of the one or more UL transmissions to be non-overlapping with a second transmit beam associated with the DL transmission or refraining from scheduling the one or more UL transmissions in a time window associated with the DL transmission.

Aspect 20 is the apparatus of any of aspects 15-19, where the sensing operation is based on measuring a reference signal received power (RSRP) or a received signal strength indicator (RSSI) of a first symbol of a semi-persistent scheduling (SPS) occasion, and where the one or more actions correspond to, based on the RSSI or the RSRP being below a threshold, receiving the one or more UL transmissions.

Aspect 21 is the apparatus of any of aspects 15-20, where the at least one processor is further configured to: receive a result of the sensing operation for the one or more UL transmissions from at least one UE of the one or more UEs.

Aspect 22 is the apparatus of any of aspects 15-21, where the result of the sensing operation is based on a reference signal received power (RSRP) or a received signal strength indicator (RSSI) of downlink control information (DCI) associated with a DL transmission associated with a second network entity, and where the one or more actions correspond to, based on the RSSI or the RSRP being above a threshold, one or more of: switching a first transmit beam of the one or more UL transmissions to be non-overlapping with a second transmit beam associated with the DL transmission or refraining from scheduling the one or more UL transmissions in a time window associated with the DL transmissions.

Aspect 23 is the apparatus of any of aspects 15-22, where the result of the sensing operation is based on a reference signal received power (RSRP) or a received signal strength indicator (RSSI) of downlink (DL) control information (DCI) associated with a DL transmission associated with a second network entity, and where the one or more actions correspond to, based on the RSSI or the RSRP being below a threshold, receiving the one or more UL transmissions.

Aspect 24 is the apparatus of any of aspects 15-23, where the result of the sensing operation is based on a reference signal received power (RSRP) or a received signal strength indicator (RSSI) of a synchronization signal block (SSB), and where the one or more actions correspond to, based on the RSSI or the RSRP being above a threshold, one or more of: switching a first transmit beam of the one or more UL transmissions to be non-overlapping with a second transmit beam associated with a DL transmission or refraining from scheduling the one or more UL transmissions in a time window associated with the DL transmission.

Aspect 25 is the apparatus of any of aspects 15-24, where the result of the sensing operation is based on a reference signal received power (RSRP) or a received signal strength indicator (RSSI) of a synchronization signal block (SSB) associated with a DL transmission associated with a second network entity, and where the one or more actions correspond to, based on the RSSI or the RSRP being below a threshold, receiving the one or more UL transmissions.

Aspect 26 is the apparatus of any of aspects 15-25, where the scheduling information is transmitted via backhaul signaling.

Aspect 27 is the apparatus of any of aspects 15-26, where the scheduling information is transmitted via over-the-air (OTA) signaling.

Aspect 28 is the apparatus of any of aspects 15-27, further including a transceiver or an antenna coupled to the at least one processor, and where the transceiver or the antenna is configured to transmit the scheduling information.

Aspect 29 is an apparatus for wireless communication at a user equipment (UE), including: a memory; and at least one processor coupled to the memory, where the at least one processor is configured to: receive scheduling information for one or more uplink (UL) transmissions associated with one or more neighbor user equipment (UEs) and a first network entity; perform a sensing operation for the one or more UL transmissions based on a downlink (DL) transmission, the DL transmission being overlapping in a timing with the one or more UL transmissions based on a dynamic time division duplex (TDD) or full-duplex; and transmit a result of the sensing operation to a second network entity.

Aspect 30 is an apparatus for wireless communication at a user equipment (UE), including: a memory; and at least one processor coupled to the memory, where the at least one processor is configured to: receive scheduling information for a downlink (DL) transmission associated with another UE and a network entity; perform a sensing operation for one or more uplink (UL) transmissions based on the scheduling information, the DL transmission being overlapping in a timing with the UL transmissions based on a dynamic time division duplex (TDD) or full-duplex; and transmit a result of the sensing operation to the network entity.

Aspect 29 is an apparatus for wireless communication at a device including a memory and at least one processor coupled to the memory and, based at least in part on information stored in the memory, configured to perform a method in accordance with any of aspects 1-28. The apparatus may include at least one of a transceiver or an antenna coupled to the at least one processor.

Aspect 30 is an apparatus for wireless communication, including means for performing a method in accordance with any of aspects 1-28.

Aspect 31 is a non-transitory computer-readable medium including instructions that, when executed by an apparatus, cause the apparatus to perform a method in accordance with any of aspects 1-28.

Aspect 32 is an apparatus for wireless communication at a device including a memory and at least one processor coupled to the memory and, based at least in part on information stored in the memory, configured to perform a method in accordance with any of aspects 29-30. The apparatus may include at least one of a transceiver or an antenna coupled to the at least one processor.

Aspect 33 is an apparatus for wireless communication, including means for performing a method in accordance with any of aspects 29-30.

Aspect 34 is a non-transitory computer-readable medium including instructions that, when executed by an apparatus, cause the apparatus to perform a method in accordance with any of aspects 29-30.

What is claimed is:

1. An apparatus for wireless communication at a first network entity, comprising:
    memory; and
    at least one processor coupled to the memory and, based at least in part on information stored in the memory, the at least one processor is configured to:
        receive, via backhaul signaling or over-the-air (OTA) signaling, scheduling information for one or more uplink (UL) transmissions associated with one or more neighbor user equipment (UEs) and a second network entity; and
        perform one or more actions based on a sensing operation for the one or more UL transmissions, wherein the sensing operation is based on measuring one of: a reference signal received power (RSRP) or a received signal strength indicator (RSSI) of downlink (DL) control information (DCI) associated with the scheduling information, the RSRP or the RSSI of the one or more UL transmissions, or the RSRP or the RSSI of a synchronization signal block (SSB) associated with the second network entity.

2. The apparatus of claim 1, wherein the at least one processor is further configured to:
    perform the sensing operation for the one or more UL transmissions.

3. The apparatus of claim 2, wherein the sensing operation is based on measuring the RSRP or the RSSI of the DL DCI associated with the scheduling information, and wherein the one or more actions correspond to, based on the RSSI or the RSRP being above a threshold, one or more of: backing off a transmit power associated with a DL transmission in a time window associated with the one or more UL transmissions, switching a first transmit beam of the DL transmission to be non-overlapping with a second transmit beam associated with the one or more UL transmissions, or refraining from scheduling the DL transmission in the time window associated with the one or more UL transmissions, and wherein the DL transmission is overlapping in a time domain with the one or more UL transmissions based on a dynamic time division duplex (TDD) or full-duplex.

4. The apparatus of claim 2, wherein the sensing operation is based on measuring the RSRP or the RSSI of the DL DCI associated with the scheduling information, and wherein the one or more actions correspond to, based on the RSSI or the RSRP being below a threshold, transmitting a DL transmission in a time window associated with the one or more UL transmissions, and wherein the DL transmission is overlapping in a time domain with the one or more UL transmissions based on a dynamic time division duplex (TDD) or full-duplex.

5. The apparatus of claim 2, wherein the sensing operation is based on measuring the RSRP or the RSSI of the one or more UL transmissions, and wherein the one or more actions correspond to, based on the RSSI or the RSRP being above a threshold, one or more of: backing off a transmit power associated with a downlink (DL) transmission in a time window associated with the one or more UL transmissions, switching a first transmit beam of the DL transmission to be non-overlapping with a second transmit beam associated with the one or more UL transmissions, or refraining from scheduling the DL transmission in the time window associated with the one or more UL transmissions, and wherein the DL transmission is overlapping in a time domain with the one or more UL transmissions based on a dynamic time division duplex (TDD) or full-duplex.

6. The apparatus of claim 2, wherein the sensing operation is based on measuring the RSRP or the RSSI of the one or more UL transmissions, and wherein the one or more strength actions correspond to, based on the RSSI or the RSRP being below a threshold, transmitting a downlink (DL) transmission in a time window associated with the one or more UL transmissions, and wherein the DL transmission is overlapping in a time domain with the one or more UL transmissions based on a dynamic time division duplex (TDD) or full-duplex.

7. The apparatus of claim 1, wherein the at least one processor is further configured to:
    receive a result of the sensing operation for the one or more UL transmissions from a UE, wherein the UE is served by the first network entity and is different from the one or more neighbor UEs, and wherein the sensing operation is based on downlink control information (DCI) comprising the scheduling information or another downlink (DL) transmission.

8. The apparatus of claim 7, wherein the result of the sensing operation is based on the RSRP or the RSSI of the DL DCI associated with the scheduling information, and wherein the one or more actions correspond to, based on the RSSI or the RSRP being above a threshold, one or more of: backing off a transmit power associated with a DL transmission in a time window associated with the one or more UL transmissions, switching a first transmit beam of the DL transmission to be non-overlapping with a second transmit beam associated with the one or more UL transmissions, or refraining from scheduling the DL transmission in the time window associated with the one or more UL transmissions, and wherein the DL transmission is overlapping in a time domain with the one or more UL transmissions based on a dynamic time division duplex (TDD) or full-duplex.

9. The apparatus of claim 7, wherein the result of the sensing operation is based on the RSRP or the RSSI of the DL DCI associated with the scheduling information, and wherein the one or more actions correspond to, based on the RSSI or the RSRP being below a threshold, transmitting a DL transmission in a time window associated with the one or more UL transmissions.

10. The apparatus of claim 7, wherein the result of the sensing operation is based on the RSRP or the RSSI of the SSB associated with the second network entity, and wherein the one or more actions correspond to, based on the RSSI or the RSRP being above a threshold, one or more of: backing off a transmit power associated with a downlink (DL) transmission in a time window associated with the one or more UL transmissions, switching a first transmit beam of the DL transmission to be non-overlapping with a second transmit beam associated with the one or more UL transmissions, or refraining from scheduling the DL transmission in the time window associated with the one or more UL transmissions, and wherein the DL transmission is overlapping in a time domain with the one or more UL transmissions based on a dynamic time division duplex (TDD) or full-duplex.

11. The apparatus of claim 7, wherein the result of the sensing operation is based on the RSRP or the RSSI of the SSB associated with the second network entity, and wherein the one or more actions correspond to, based on the RSSI or the RSRP being below a threshold, transmitting a downlink (DL) transmission in a time window associated with the one or more UL transmissions, and wherein the DL transmission is overlapping in a time domain with the one or more UL transmissions based on a dynamic time division duplex (TDD) or full-duplex.

12. The apparatus of claim 1, wherein to receive the scheduling information, the at least one processor is configured to receive the scheduling information via the backhaul signaling.

13. The apparatus of claim 1, wherein to receive the scheduling information, the at least one processor is configured to receive the scheduling information via the OTA signaling.

14. The apparatus of claim 1, further comprising a transceiver or an antenna coupled to the at least one processor, and wherein the transceiver or the antenna is configured to receive the scheduling information.

15. An apparatus for wireless communication at a first network entity, comprising:
   memory; and
   at least one processor coupled to the memory, wherein the at least one processor is configured to:
      receive scheduling information for a downlink (DL) transmission associated with one or more user equipment (UEs); and
      perform one or more actions based on a sensing operation for one or more uplink (UL) transmissions based on the scheduling information, the DL transmission being overlapping in a timing with the one or more UL transmissions based on a dynamic time division duplex (TDD) or full-duplex, wherein the sensing operation is based on measuring one of: a reference signal received power (RSRP) or a received signal strength indicator (RSSI) of downlink (DL) control information (DCI) associated with the DL transmission, the RSRP or the RSSI of a first symbol of a semi-persistent scheduling (SPS) occasion, or the RSRP or the RSSI of a synchronization signal block (SSB) associated with a second network entity.

16. The apparatus of claim 15, wherein the at least one processor is further configured to:
   perform the sensing operation for the one or more UL transmissions.

17. The apparatus of claim 16, wherein the sensing operation is based on measuring the RSRP or the RSSI of the DL DCI associated with the DL transmission associated with the second network entity, and wherein the one or more actions correspond to, based on the RSSI or the RSRP being above a threshold, one or more of: switching a first transmit beam of the one or more UL transmissions to be non-overlapping with a second transmit beam associated with the DL transmission or refraining from scheduling the one or more UL transmissions in a time window associated with the DL transmission.

18. The apparatus of claim 16, wherein the sensing operation is based on measuring the RSRP or the RSSI of the DL DCI associated with the DL transmission associated with the second network entity, and wherein the one or more actions correspond to, based on the RSSI or the RSRP being below a threshold, receiving the one or more UL transmissions.

19. The apparatus of claim 16, wherein the sensing operation is based on measuring the RSRP or the RSSI of the first symbol of the SPS occasion associated with a DL transmission associated with the second network entity, and wherein the one or more actions correspond to, based on the RSSI or the RSRP being above a threshold, one or more of: switching a first transmit beam of the one or more UL transmissions to be non-overlapping with a second transmit beam associated with the DL transmission or refraining from scheduling the one or more UL transmissions in a time window associated with the DL transmission.

20. The apparatus of claim 16, wherein the sensing operation is based on measuring the RSRP or the RSSI of the first symbol of the SPS occasion, and wherein the one or more actions correspond to, based on the RSSI or the RSRP being below a threshold, receiving the one or more UL transmissions.

21. The apparatus of claim 15, wherein the at least one processor is further configured to:
   receive a result of the sensing operation for the one or more UL transmissions from at least one UE of the one or more UEs.

22. The apparatus of claim 21, wherein the result of the sensing operation is based on the RSRP or the RSSI of DCI associated with a DL transmission associated with the second network entity, and wherein the one or more actions correspond to, based on the RSSI or the RSRP being above a threshold, one or more of: switching a first transmit beam of the one or more UL transmissions to be non-overlapping with a second transmit beam associated with the DL transmission or refraining from scheduling the one or more UL transmissions in a time window associated with the DL transmissions.

23. The apparatus of claim 21, wherein the result of the sensing operation is based on the RSRP or the RSSI of the DL DCI associated with a DL transmission associated with the second network entity, and wherein the one or more actions correspond to, based on the RSSI or the RSRP being below a threshold, receiving the one or more UL transmissions.

24. The apparatus of claim 21, wherein the result of the sensing operation is based on the RSRP or the RSSI of the SSB, and wherein the one or more actions correspond to, based on the RSSI or the RSRP being above a threshold, one or more of: switching a first transmit beam of the one or more UL transmissions to be non-overlapping with a second transmit beam associated with a DL transmission or refraining from scheduling the one or more UL transmissions in a time window associated with the DL transmission.

25. The apparatus of claim 21, wherein the result of the sensing operation is based on the RSRP or the RSSI of the associated with a DL transmission associated with the second network entity, and wherein the one or more actions correspond to, based on the RSSI or the RSRP being below a threshold, receiving the one or more UL transmissions.

26. The apparatus of claim 15, wherein to transmit the scheduling information, the at least one processor is configured to transmit the scheduling information is via backhaul signaling.

27. The apparatus of claim 15, wherein to transmit the scheduling information, the at least one processor is configured to transmit the scheduling information is via over-the-air (OTA) signaling.

28. The apparatus of claim 15, further comprising a transceiver or an antenna coupled to the at least one processor, and wherein the transceiver or the antenna is configured to transmit the scheduling information.

29. An apparatus for wireless communication at a user equipment (UE), comprising:
   memory; and
   at least one processor coupled to the memory, wherein the at least one processor is configured to:

receive scheduling information for one or more uplink (UL) transmissions associated with one or more neighbor user equipment (UEs) and a first network entity;

perform a sensing operation for the one or more UL transmissions based on a downlink (DL) transmission, the DL transmission being overlapping in a timing with the one or more UL transmissions based on a dynamic time division duplex (TDD) or full-duplex, and wherein the sensing operation is on downlink control information (DCI) that comprises the scheduling information for the one or more UL transmissions; and transmit a result of the sensing operation to a second network entity.

30. An apparatus for wireless communication at a user equipment (UE), comprising:

memory; and at least one processor coupled to the memory, wherein the at least one processor is configured to:

receive scheduling information for a downlink (DL) transmission associated with another UE and a network entity;

perform a sensing operation for one or more uplink (UL) transmissions based on the scheduling information, the DL transmission being overlapping in a timing with the UL transmissions based on a dynamic time division duplex (TDD) or full-duplex, wherein the UE is served by a second network entity that is different from the network entity, and wherein the sensing operation is on downlink control information (DCI) comprising the scheduling information for the DL transmission; and transmit a result of the sensing operation to the network entity.

* * * * *